United States Patent
Shiota et al.

(10) Patent No.: US 6,187,472 B1
(45) Date of Patent: *Feb. 13, 2001

(54) THIN BATTERY

(75) Inventors: Hisashi Shiota; Tetsuhide Yokoyama; Shigeru Aihara; Syo Shiraga, all of Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/027,221

(22) Filed: Feb. 20, 1998

(30) Foreign Application Priority Data

Feb. 24, 1997 (JP) .................................... 9-039319
Nov. 12, 1997 (JP) .................................... 9-310606

(51) Int. Cl.[7] .................................... H01M 6/00
(52) U.S. Cl. .................... 429/127; 429/211; 429/61; 429/133; 429/161; 429/57
(58) Field of Search ................ 429/59, 57, 128, 429/135, 127, 162, 211, 61, 121, 7, 136, 123, 133, 161

(56) References Cited

U.S. PATENT DOCUMENTS

| | | | |
|---|---|---|---|
| 3,907,599 | * 9/1975 | Fanciullo et al. | 136/111 |
| 5,326,652 | * 7/1994 | Lake | 429/127 |
| 5,437,692 | 8/1995 | Dasgupta et al. | |
| 5,456,000 | 10/1995 | Gozdz et al. | |
| 5,456,813 | * 10/1995 | Grange-Cossou et al. | 204/284 |
| 5,498,489 | 3/1996 | Dasgupta et al. | |
| 5,585,206 | * 12/1996 | Morris | 429/161 |
| 5,652,043 | * 7/1997 | Nitzan | 428/209 |
| 5,747,187 | * 5/1998 | Byon | 429/58 |
| 5,750,277 | * 5/1998 | Vu et al. | 429/7 |
| 5,766,790 | * 6/1998 | Kameishi et al. | 429/59 |
| 5,871,861 | * 2/1999 | Hirokou et al. | 429/149 |

* cited by examiner

*Primary Examiner*—Stephen Kalafut
*Assistant Examiner*—Raymond Alejandro
(74) *Attorney, Agent, or Firm*—Oblon, Spivak, McClelland, Maier & Neustadt, P.C.

(57) ABSTRACT

A thin battery includes a flat battery body having a positive electrode and a negative electrode having an electrolyte layer disposed between the electrodes. A flexible encapsulating bag seals the battery body with a sealing portion. A positive electrode collector tab and a negative electrode collector tab are respectively connected to the positive and negative electrodes. The tabs penetrate the encapsulating bag. At least one of the tabs includes first and second collector tabs and a safety device so that an electrical connection between the first and second collector tabs may be interrupted when the internal pressure of the encapsulating bag exceeds a predetermined value.

21 Claims, 26 Drawing Sheets

△: DIRECTION OF ORIENTATION OF THIN ALUMINUM LAYER (LONGITUDINAL DIRECTION)

□: CROSSWISE DIRECTION OF DIRECTION OF ORIENTATION OF THIN ALUMINUM LAYER (LATERAL DIRECTION)

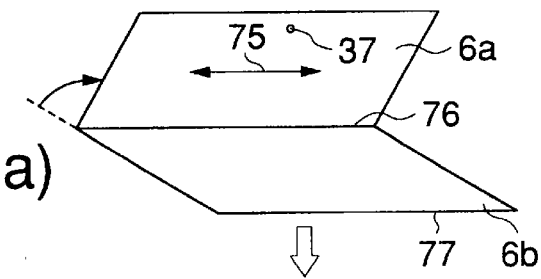
FIG.21(a)
FIG.21(b)
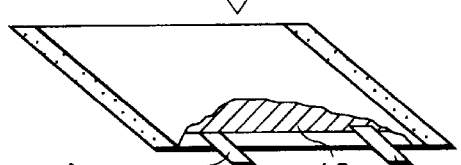
FIG.21(c)
FIG.21(d)
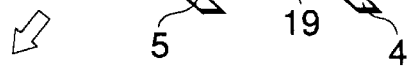
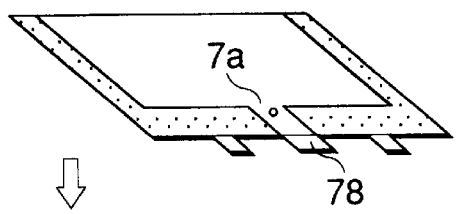
FIG.21(e1)
FIG.21(e2)
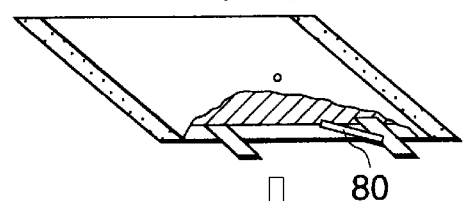
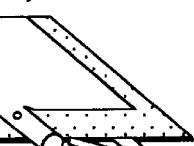
FIG.21(f1)
FIG.21(f2)
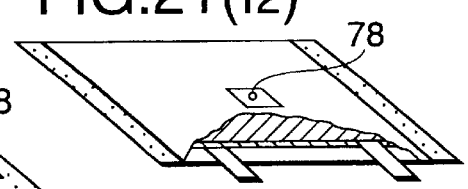
FIG.21(g2)
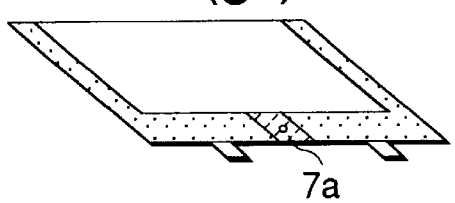
FIG.21(g1)
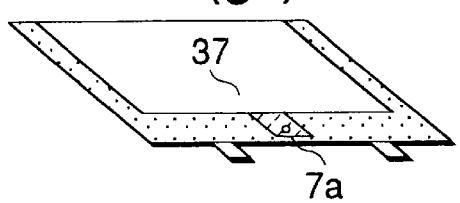

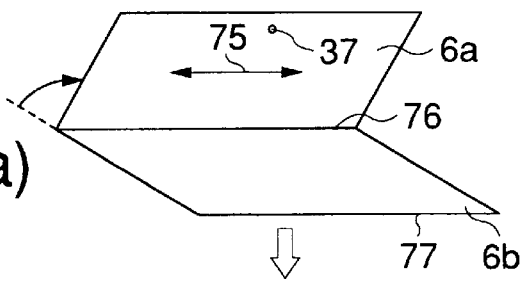
FIG.22(a)
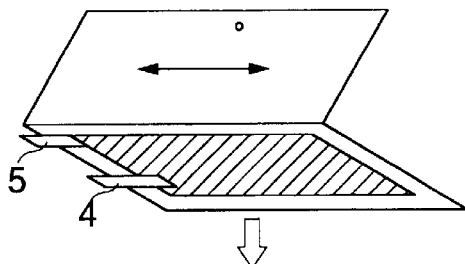
FIG.22(b)
FIG.22(c)
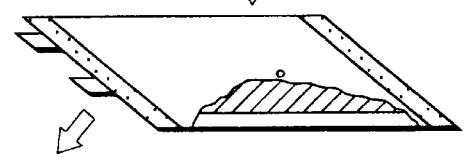
FIG.22(d)
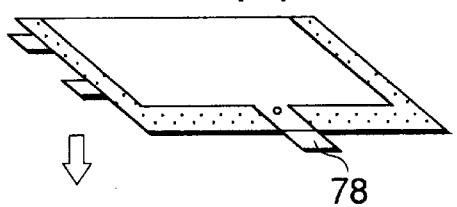
FIG.22(e1)
FIG.22(e2)
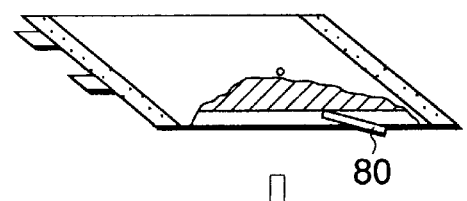
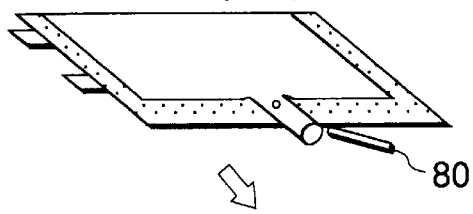
FIG.22(f1)
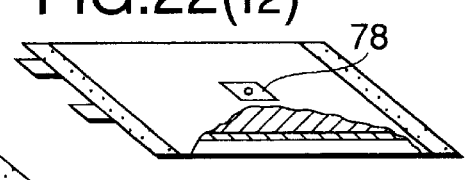
FIG.22(f2)
FIG.22(g2)
FIG.22(g1)
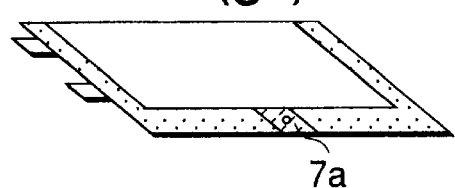

THIN BATTERY

BACKGROUND OF THE INVENTION

1. Field of the Invention

The present invention relates to a light weight small-sized thin battery to be mounted in portable electronic apparatus. The present invention relates to, e.g., lithium ion secondary battery which needs to be sealed so that it is free of water content, particularly a thin battery comprising a safety mechanism which can work when the battery body is simply sealed in the form of bag.

2. Description of the Related Art

FIG. 30 illustrates a schematic diagram of a prior art thin secondary battery disclosed in publications (e.g., "Kouseino Denchi no saishin manyuaru (Modern manual of high performance battery)", Sogo Gijutsu Center, page 185, 1989). In this drawing, the reference numeral 1 indicates a positive electrode, the reference numeral 2 indicates a negative electrode, the reference numeral 3 indicates a separator, the reference numeral 4 indicates a positive electrode collector tab, the reference numeral 5 indicates a negative electrode collector tab, the reference numeral 6 indicates an encapsulating bag, the reference numeral 7 indicates a bag sealing portion, the reference numeral 8 indicates a coating portion for metal bonding, the reference numeral 9 indicates a silicone oil, and the reference numeral 10 indicates a reinforcing resin plate.

In the foregoing example, the bag sealing portion 7 is bonded to the majority of the periphery of a small-sized sealed lead storage battery to seal a battery body 19 composed of the positive electrode 1, the negative electrode 2, the separator 3 and an electrolyte in the encapsulating bag 6 made of an insulating material for the purpose of reducing the size and weight of the case of the small-sized sealed lead storage battery. The collector tabs 4 and 5 are conductors for making electrical input/output between the internal electrode and the external circuit and are connected to the positive electrode 1 and the negative electrode 2, respectively. The coating for metal bonding 8 is provided to connect the collector tabs 4 and 5 to the encapsulating bag 6. Finally, the electrolyte is injected into the encapsulating bag 6 through the unsealed opening at the top of the battery body as viewed in FIG. 30. The opening is then sealed with the silicone oil 9 and the reinforcing resin plate 10. However, this battery is not equipped with a safety mechanism for blocking current passage upon the occurrence of troubles such as overcharging and shortcircuiting or relaxing the inner pressure of the encapsulating bag 6.

FIG. 31 is a sectional view illustrating a prior art hermetically-sealed can battery as disclosed in JP-A-6-140012 (The term "JP-A" as used herein means an "unexamined published Japanese patent application"). In the drawing, the reference numeral 11 indicates a positive electrode terminal plate, the reference numeral 12 indicates a negative electrode terminal plate, the reference numeral 14 indicates a safety valve, the reference numeral 15 indicates a spring, the reference numeral 16 indicates a gasket, the reference numeral 17 indicates an electrolyte, and the reference numeral 18 indicates a casing.

In the foregoing example, a cylindrical lithium ion battery comprising a positive electrode 1, a negative electrode 2, a separator 3 and the electrolyte 17 assembled into a battery body comprises a rubber elastic safety valve 14 supported by a spring 15 and provided interposed between the positive electrode terminal plate 11 and the sealing plate 13. The valve hole is normally closed. The pressure at which the valve begins to open is set to a predetermined value. In this arrangement, any accidents such as rupture due to the rise in the inner pressure of the battery can be prevented. Further, the deterioration of the battery body due to the opening of the battery can be inhibited.

FIG. 32 is a sectional view illustrating a prior art sealed can battery as disclosed in JP-A-6-96803. In this drawing, the reference numeral 21 indicates a positive electrode lead which electrically connects a positive electrode 1 to a sealing plate 13. The reference numeral 22 indicates an explosion-proof switch which normally is electrically connected to the sealing plate 13 at its point 22b. The reference numeral 23 indicates an insulating sheet. The reference numeral 24 indicates an insulating material.

In normal operation, the electrical connection between the positive electrode 1 and the positive electrode terminal plate 11 is secured by the positive electrode lead 21, the sealing plate 13 and the explosion-proof switch 22 to allow the battery body to act as a battery. When gas is produced from the interior of the battery due to overcharging or shortcircuiting, the inner pressure of the battery rises to cause the central part 22a of the explosion-proof switch 22 to deform. When the inner pressure of the battery reaches the predetermined value, the contact point 22b is released from electrical connection to the sealing plate 13. In this arrangement, current passage is blocked upon overcharging or shortcircuiting to prevent ignition or rupture of the battery.

In general, when gas is produced from the electrolyte or active material due to overcharging or shortcircuiting in a sealed battery encapsulating a battery body, the inner pressure of the sealed portion rises to possibly cause troubles such as ignition or rupture. Therefore, a safety valve for relaxing inner pressure as shown in FIG. 31 or a current blocking device as shown in FIG. 32 is needed. As in the conventional examples shown in FIGS. 31 and 32, various safety devices have been proposed for sealed can batteries comprising a casing prepared from a difficultly-deformable material such as metal and ABS.

In recent years, with the spread of portable electronic apparatus, further reduction of the weight, size and thickness of these portable electronic apparatus have been required. In order to simplify the casing or electrode terminal, a sealed battery comprising a battery body 19 simply sealed in the form of bag with an insulating coating material as shown in FIG. 30 has been developed. However, any small-sized light safety mechanism which makes the best use of this simple sealing has been little studied.

The secondary lithium battery which is under extensive development at present comprises lithium metal or lithium ion as a positive electrode active material. In this arrangement, a battery having a lighter weight which supplies a higher voltage than ever can be obtained. However, since such a positive electrode active material is weak to the invasion of water from the air, it is necessary that the entire battery body be completely sealed. Further, since lithium batteries have a high energy density, further care must be taken against accidents such as shortcircuiting.

SUMMARY OF THE INVENTION

The present invention has been worked out to eliminate these problems. An object of the present invention is to realize in a form as light and small as possible in a simple way a safety mechanism for blocking current passage, relaxing the rise in the inner pressure of the battery and preventing electrolyte leakage during overcharging or shortcircuiting in a thin battery sealed in the form of bag with a flexible insulating coating material such as heat-fused laminated film by making the use of the characteristics of such a simple encapsulating bag.

The first aspect of the present invention concerns a thin battery comprising a flat battery body having a positive electrode and a negative electrode laminated with an ionically-conducting layer provided interposed therebetween, a flexible encapsulating bag for sealing said battery body with a sealing portion, and positive electrode collector tab and negative electrode collector tab connected to said positive electrode and said negative electrode, respectively, and penetrating a part of said encapsulating bag to make an electrical input/output to the external circuit, wherein said positive electrode or negative collector tab comprises a first collector tab connected to the electrode and a second collector tab connected to the external circuit and a safety device is provided comprising a means for retaining electrical connection between said first collector tab and said second collector tab and a means which releases said retaining means by when the inner pressure of said encapsulating bag excess a predetermined value.

The second aspect of the present invention concerns a thin battery according to the first aspect of the present invention, wherein said releasing means releases said retaining means making the use of expansion deformation when the difference between the inner pressure and the external pressure of said encapsulating bag exceeds a first predetermined value.

The third aspect of the present invention concerns a thin battery according to the first aspect of the present invention, wherein said first or second collector tab releases said retaining means in response to expansion deformation of said encapsulating bag.

The fourth aspect of the present invention concerns a thin battery according to the first aspect of the present invention, wherein said retaining means utilizes at least one of spring fore, magnetic force, frictional force, tack and electrostatic force.

The fifth aspect of the present invention concerns a thin battery according to the first aspect of the present invention, wherein said safety device further comprises a means which releases said retaining means when the temperature rises due to the passage of excessive current.

The sixth aspect of the present invention concerns a thin battery comprising a flat battery body having a positive electrode and a negative electrode laminated with an ionically-conducting layer provided interposed therebetween, an encapsulating bag for sealing said battery body with a sealing portion, and positive electrode and negative electrode collector tabs connected to said positive electrode and said negative electrode, respectively, and penetrating a part of said encapsulating bag to make an electrical input/output to the external circuit, wherein at least one of positive electrode and negative collector tab comprises a first collector tab connected to the electrode and a second collector tab connected to the external circuit, said first and second collector tab being made of a material which deforms with the rise in the ambient temperature and a safety device is provided comprising a means for retaining electrical connection between said first collector tab and said second collector tab and a means which releases said retaining means when the temperature rises due to the passage of excessive current.

The seventh aspect of the present invention concerns a thin battery according to the first aspect of the present invention, further comprising a reconnection preventive means for preventing said first and second collector tabs from making electrical reconnection to said retaining means after the release of said retaining means by said releasing means.

The eighth aspect of the present invention concerns a thin battery according to the sixth aspect of the present invention, wherein said reconnection preventive means also serves as a part of said retaining means.

The ninth aspect of the present invention concerns a thin battery comprising a flat battery body having a positive electrode and a negative electrode laminated with an ionically-conducting layer provided interposed therebetween, an encapsulating bag for sealing said battery body with a sealing portion, and positive electrode and negative electrode collector tabs connected to said positive electrode and said negative electrode, respectively, and penetrating a part of said encapsulating bag to make an electrical input/output to the external circuit, wherein said sealing portion comprises a section to give an expected rupture point.

The tenth aspect of the present invention concerns a thin battery according to the eighth aspect of the present invention, wherein said section has a weak peel strength The eleventh aspect of the present invention concerns a thin battery according to the tenth aspect of the present invention, wherein said section is provided on a portion which undergoes a great peel stress due to expansion deformation of said encapsulating bag.

The twelfth aspect of the present invention is a thin battery according to the tenth aspect of the present invention, wherein said expected rupture point has a hole made in said sealing portion on a portion which undergoes a great peel stress due to expansion deformation of said encapsulating bag.

The thirteenth aspect of the present invention is a thin battery according to the ninth aspect of the present invention, wherein a sharp protrusion is provided which penetrates said encapsulating bag at the expected rupture point when said encapsulating bag undergoes expansion deformation.

The fourteenth aspect of the present invention concerns a thin battery according to the thirteenth aspect of the present invention, wherein said expected rupture point is covered by a liquid-absorbing material.

The fifteenth aspect of the present invention concerns a thin battery according to the thirteenth aspects of the present invention, wherein said expected rupture point is covered by an exhaust mechanism having an exhaust path and an exhaust outlet.

The sixteenth aspect of the present invention concerns a thin battery according to the first aspect of the present invention, wherein said safety device is provided on the top surface of said flat battery body and on the side surface of said battery body in the vicinity of said sealing portion.

The seventeenth aspect of the present invention concerns a thin battery according to the first aspect of the present invention, wherein said flat battery body comprises a plurality of electrode laminates having a positive electrode and a negative electrode laminated with an ionically-conducting layer provided interposed therebetween.

The eighteenth aspect of the present invention concerns a thin battery according to the seventeenth aspect of the present invention, wherein said plurality of electrode laminates are formed by alternately arranging a positive electrode and a negative electrode between a plurality of separated ionically-conducting layers.

The nineteenth aspect of the present invention concerns a thin battery according to the seventeenth aspect of the present invention, wherein said plurality of electrode laminates are formed by alternately interposing a positive electrode and a negative electrode between the gap of a wound ionically-conducting layer.

The twentieth aspect of the present invention concerns a thin battery according to the seventeenth aspect of the present invention, wherein said plurality of electrode laminates are formed by alternately interposing a positive electrode and a negative electrode between the gap of a folded ionically-conducting layer.

BRIEF DESCRIPTION OF THE DRAWINGS

FIG. 2 is a sectional view taken on line A—A of FIG. 1.

FIG. 5 illustrates the configuration of a thin secondary battery comprising a collector tab with a current blocking function according to Embodiment 3 of the present invention. In some detail.

FIG. 6 is a sectional view illustrating the configuration of a thin secondary battery comprising a collector tab with a current blocking function according to Embodiment 4 of the present invention. In some detail.

FIG. 7 is a sectional view illustrating the configuration of a thin secondary battery comprising a collector tab with a current blocking function according to Embodiment 5 of the present invention. In some detail.

FIG. 8 is a sectional view illustrating the configuration of a thin secondary battery comprising a collector tab with a current blocking function according to Embodiment 6 of the present invention. In some detail.

FIG. 13 concerns Embodiment 7 of the present invention and is a diagram illustrating the condition of the periphery of the area to which the collector tab is heat fusion-sealed.

FIG. 20 concerns Embodiment 7 of the present invention.

FIG. 21 concerns Embodiments 8 to 10 of the present invention and is a tree diagram illustrating the order of steps for sealing a thin lithium battery in the form of a rectangle.

FIG. 22 concerns Embodiment 11 of the present invention and is a tree diagram illustrating the order of steps for sealing a thin lithium battery in the form of a rectangle.

PREFERRED EMBODIMENTS OF THE INVENTION

Embodiment 1

Figure 1:
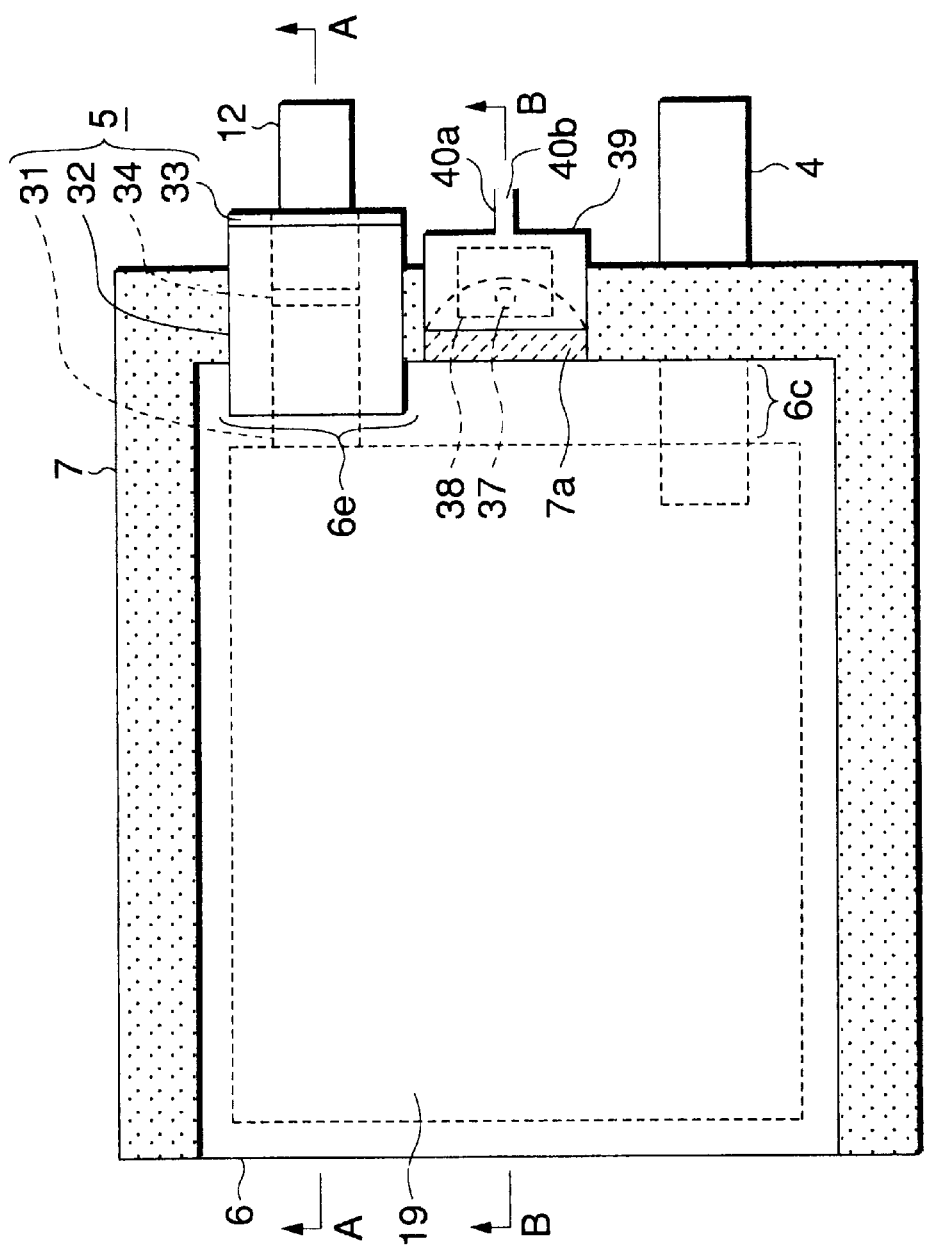
FIG. 1 is a plan view illustrating the entire configuration of a thin secondary battery with a safety device according to Embodiment 1 of the present invention.
Figure 2A:
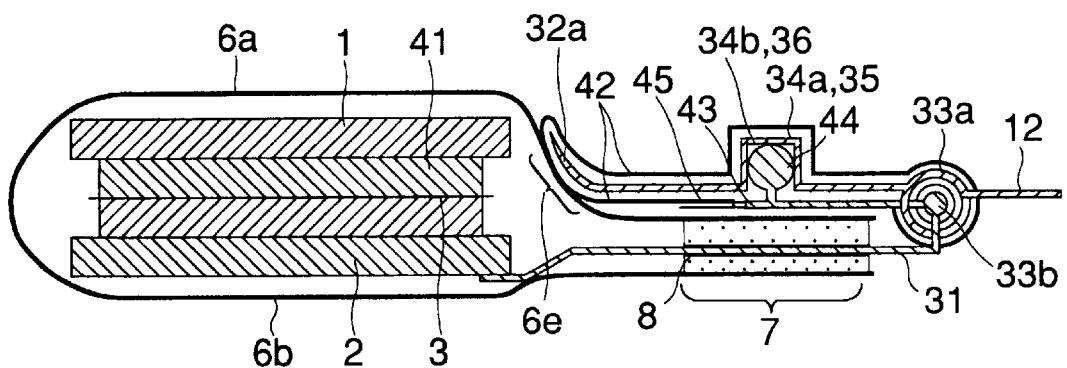
FIG. 2(a) illustrates how the battery works during normal charging/discharging.
Figure 2B:
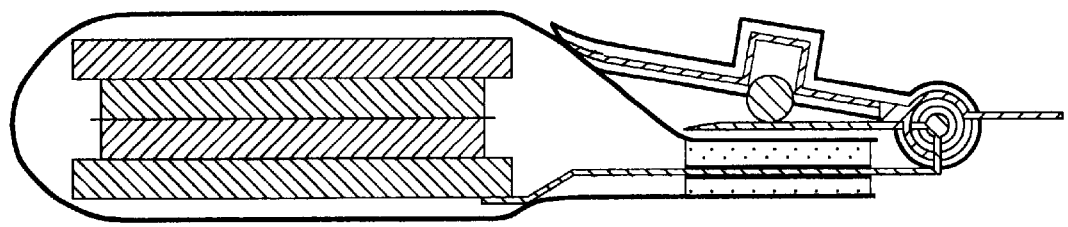
FIG. 2(b) illustrates how the collector tab acts to block current passage when the inner pressure of the encapsulating bag rises.

A thin battery according to Embodiment 1 of the present invention will be described in connection with the drawings. FIG. 1 is an entire schematic diagram as viewed from the top of a thin secondary battery equipped with a safety device according to Embodiment 1 of the present invention. FIG. 2 is a sectional view taken on line A—A of FIG. 1. FIG. 2(a) illustrates how the battery works during normal charging/discharging. FIG. 2(b) illustrates how the collector tab acts to block current passage when the inner pressure of the flexible encapsulating bag rises. In these drawings, the reference numerals 1 and 2 indicate a positive electrode and a negative electrode, respectively. The reference numerals 3 and 41 indicate a separator and an electrolyte layer, respectively. The separator 3 and the electrolyte 41 together form an ionically-conducting layer. The electrolyte 41 is any one of solid state, gel state electrolyte and material impregnated by liquid electrolyte. The reference numerals 4, 5, 6, 7 and 8 indicate a positive electrode collector tab, a negative electrode collector tab, an encapsulating bag, a bag sealing portion and a coating portion for metal bonding, respectively. In order to seal a battery body 19 composed of the positive electrode 1, a negative electrode 2, the separator 3 and the electrolyte layer 41 in the encapsulating bag 6 made of an insulating material, the bag sealing portion 7 is bonded to the majority of the periphery of the encapsulating bag 6. The collector tabs 4 and 5 each are a conductor for making electrical input/output between the internal electrode and the external circuit. The collector tabs 4 and 5 are connected to the positive electrode 1 and the negative electrode 2, respectively, in the encapsulating bag 6. The coating for metal bonding 8 is provided to connect the collector tabs 4 and 5 to the encapsulating bag 6. The reference numerals 6a, 6b, 6c and 12 indicate the upper side of the encapsulating bag, the lower side of the encapsulating bag, a portion positioned between the battery body 19 and the bag sealing portion 7 and a negative electrode terminal plate, respectively. The reference numerals 31, 32, 33, 33a, 33b, 34, 34a, 34b, 7a, 35, 36, 37, 38, 39, 40a, 40b, 41, 42, 43, 44 and 45 indicate an internal electrode connector, an external circuit connector, a hinge portion, a female hinge portion, a male hinge portion, a joint portion, a female joint portion, a male joint portion, a sealing portion having a weak peel strength (peeling adhesive strength defined according to JIS K6854), a groove, a metal rod, an expected rupture hole, a liquid-absorbing material an exhaust mechanism, an exhaust induction path, an exhaust outlet, an electrolyte layer, an electrical insulating coating portion, a dislocation preventive valve, an electrical contact area and a needle, respectively.

Figure 30:
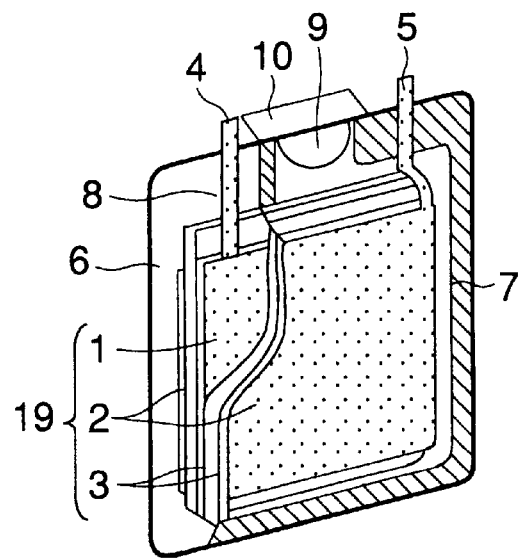
FIG. 30 is a partly broken perspective view of the configuration of the conventional thin secondary battery.
Figure 31:
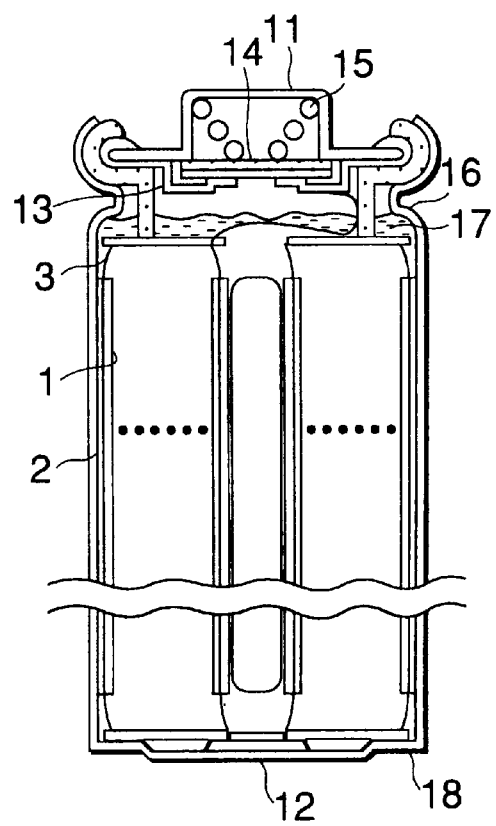
FIG. 31 is a sectional view illustrating a hermetically-sealed can battery with the conventional evacuation mechanism.
Figure 32:
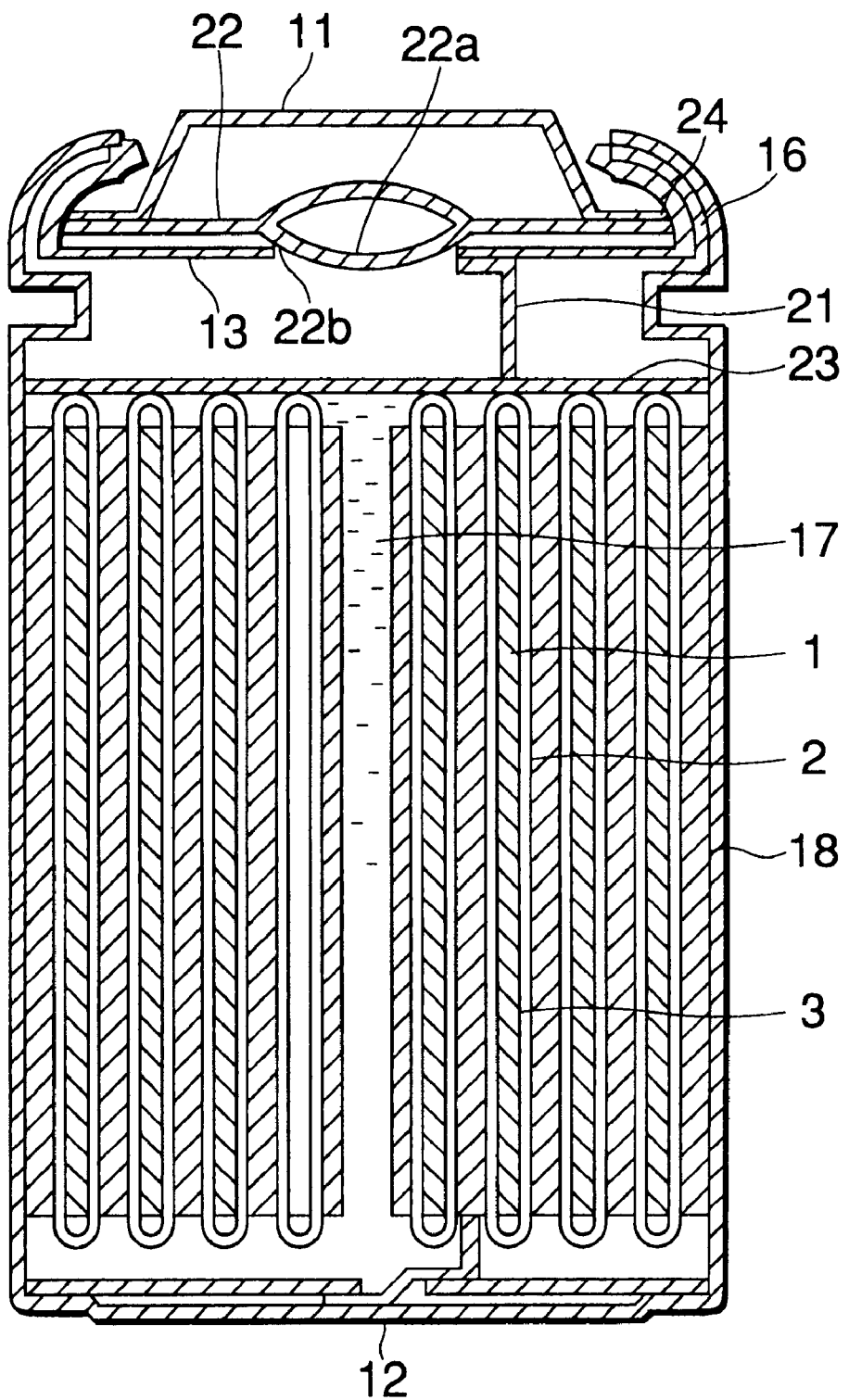
FIG. 32 is a sectional view illustrating a hermetically-sealed can battery with the conventional current blocking function.

The basic structure of the thin secondary battery excluding the safety mechanism is almost the same as that of the conventional example of FIG. 30, and its description is omitted. The collector tab with a current blocking function shown in FIGS. 1 and 2 will be described hereinafter. The expected rupture hole 37, the liquid-absorbing material 38 and the exhaust mechanism 39 provided in the sealing portion 7a having a weak peel strength will be further described in the embodiments described later.

The collector tab 5 with a current blocking function connected to the negative electrode 2 provided on the lower side of the battery body 19 is composed of a first collector tab connected to the negative electrode, i.e., external circuit connector 32 and a second collector tab connected to the external circuit, i.e., internal electrode connector 31. The two connectors 31, 32 are fastened to the hinge 33 and the joint 34 to retain the electrical contact surface 44. The internal electrode connector 31 comprises the male joint portion 34b composed of the metal rod 35 and the male hinge portion 33b. The external circuit connector 32 is mainly composed of a rectangular metal plate having a cylindrical female portion 33a provided on one side thereof. In this arrangement, the external circuit connector 32 is hinged to the internal electrode connector 31 while being electrically insulated therefrom. The external circuit connector 32 comprises the female joint portion 34a made of the groove 35 in the vicinity of the central portion thereof. During normal charging/discharging, the rod 36 is kept inserted in the groove 35 so that the external circuit connector 32 keeps the electrical contact surface 44 with the internal electrode connector 31. Further, the dislocation preventive valve 43 prevents the rod 36 from coming off the groove 36. The other side of the external circuit connector 32 corresponds to the portion 32a which receives force from the position 6e of the encapsulating bag when the bag undergoes expansion deformation. The portion 32a is fixed to the encapsulating bag on the portion 6c between the battery body 19 and the bag sealing portion 7 and on the top surface 6a of the encapsulating bag of the battery body 19. The portion 6c of the encapsulating bag must be able to undergo expansion deformation also when the casing into which the thin secondary battery is inserted is a rectangular container having almost the same thickness as above.

When the inner pressure of the encapsulating bag 6 rises, the portion 6c undergoes expansion deformation to force the tip 32a of the external circuit connector 32 upward at the position 6e. When the inner pressure of the encapsulating bag 6 rises so that the difference between the inner pressure and the external pressure of the encapsulating bag 6 exceeds a first predetermined value, the force that pushes up the groove 35 exceeds the critical force of the valve 43 for preventing the rod 36 from coming off the groove 35. As a result, the rod 36 comes off the groove 35 to cause the electrical contact surface 44 to be dislocated. In order to keep the two connectors 31, 32 electrically insulated from each other in this state, the external circuit connector 32 is covered by the electrical insulating coating 42, e.g., glass fiber-filled fluororesin adhesive tape (Chuko Flow Adhesive Tape AGF100, available from Chuko Chemical Industries Ltd.) on the surface excluding the inner surface of the groove 35 and the surface of the negative electrode terminal 12. The corners of the groove 35, too, are covered by the electrical insulating coating 42 to narrow the width of the opening of the groove 35 to a value less than that of the rod 36. In this arrangement, the dislocation preventive valve 43 works. Once the rod 32 comes off the groove 35, non-conduction can be kept unless the two connectors are re-connected to each other. Further, when the inner pressure of the encapsulating bag 6 continues to rise even after the actuation of the current blocking function to keep the encapsulating bag 6 expanding until the difference between the inner pressure and the external pressure of the encapsulating bag exceeds a second predetermined value, the inner end of the bag sealing portion 7 is peeled off and undergoes expansion deformation. As a result, the needle 45 attached to the tip of the internal electrode connector 31 penetrates the encapsulating bag 6 at the predetermined position, i.e., expected rupture position so that the encapsulating bag 6 is broken to cause exhaust and hence reduce the inner pressure of the encapsulating bag. The needle 45 may be replaced by a sharp protrusion such as blade.

The second predetermined value can be properly adjusted by the expression between the peel strength at which the bag sealing portion begins to peel off and the peel stress applied to the encapsulating bag due to the difference between the inner pressure and the external pressure of the encapsulating bag.

The first predetermined value of the difference between the inner pressure and the external pressure of the encapsulating bag at which the rod 36 comes off the groove 35 to cause the electrical contact surface 44 to be dislocated can be properly adjusted by, e.g., the material of the groove 35 or the dimensional expression between the groove 35 and the rod 36.

Figure 3A:
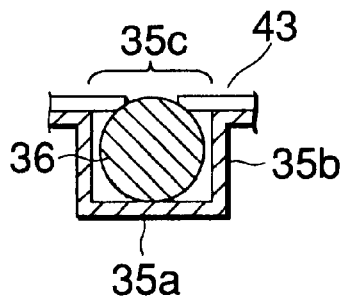
FIG. 3 concerns Embodiment 1 of the present invention and is a sectional view illustrating an embodiment of groove in the female joint portion.
Figure 3B:
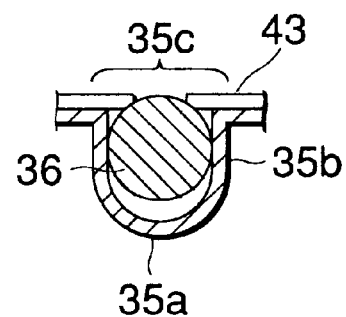
Figure 3C:
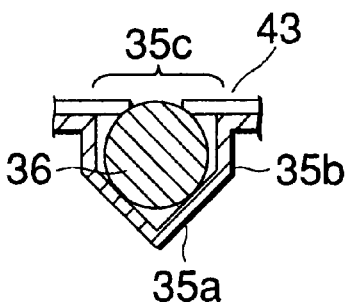
Figure 3D:
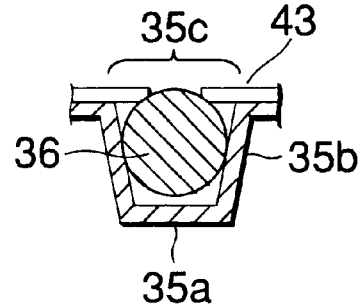
Figure 3E:
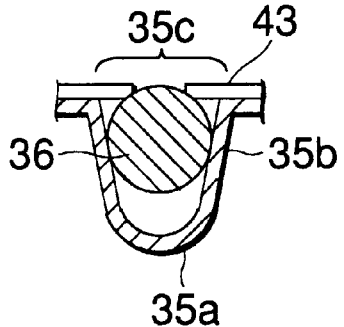
Figure 3F:
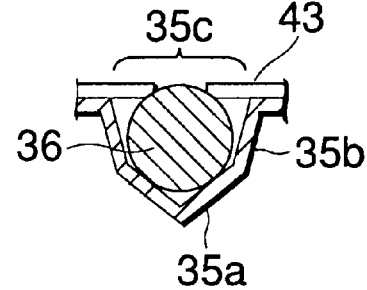

The shape of the groove 35 constituting the female portion 34a of the joint 34 will be described in connection with FIG. 3. In this drawing, the reference numerals 35a, 35b and 35c indicate the bottom portion of the groove, the sidewall of the groove and the opening of the groove, respectively. FIG. 3(a) illustrates the same groove as shown in FIGS. 2(a) and (b). Besides this shape of the groove, those shown in FIGS. 3(b) to (e) may be employed. In other words, those having a flat bottom portion 35a (a and d), those having a round bottom portion 35a (b and e) and those having a triangular bottom portion 35a (c and f) are possible. The sidewalls 35b may be parallel (a, b, c) or may be gradually separated toward the opening 35c (d, e, f). In any case, the same results as obtained in the case of FIG. 3(a) can be obtained. In the case where the sidewalls 35b are parallel (a, b, c), the gap between the sidewalls 35b may be about 90% of the outer diameter of the foregoing rod 36 so that the rod 36 is clamped by the sidewalls 35b to keep electrical contact therebetween as shown in FIG. 3(c). Further, the open corners of the groove are covered by, e.g., a glass fiber-filled fluororesin tape 43 having a thickness 100 $\mu$m to narrow the width of the opening 3c to a range of from 50 to 90% of the outer diameter of the rod 36 so that the rod 36 can hardly come off the groove 35. In this arrangement, the optimum height of the sidewall 35b is about the outer diameter of the rod 36. The gap between the sidewalls 35b in the case where the sidewalls 35b are gradually separated toward the opening 35c may be designed in almost the same manner as in the case where the sidewalls 35b are parallel. However, if the width of the opening 35c is too great or the height of the sidewall 35b is too great, the desired electrical contact cannot be kept. Therefore care must be taken.

Table 1 shows a summary of the tensile strength, Young's modulus, yield point and electrical resistance of typical metal materials with reference to publications such as "Kikai sekkei binran (Handbook of Machine Design)", Maruzen, 1979, and "Bane (Spring)", Maruzen, 1982. Table 1 shows that metal materials having a high Young's modulus and rigidity can be hardly deformed. Table 1 also shows that metal materials having a high elastic limit (yield point in this table) can hardly undergo plastic deformation. Metal materials suitable for the joint 34 and the collector tab 5 with a current blocking function will be described in connection with Table 1. As the material of the rod 35 constituting the male joint portion 34b there may be preferably used stainless steel or nickel alloy, which has a Young's modulus and rigidity high enough to resist deformation. Since the groove 36 constituting the female joint portion 34a is a portion that deforms so as to clamp the rod 35, its material is preferably a thin plate of a material which has a yield point high enough to resist plastic deformation and a Young's modulus low enough to undergo elastic deformation, such as copper alloy for spring, e.g., phosphor bronze, German silver and beryllium-copper.

As the main material constituting the external circuit connector 32 of the collector tab 5 with a current blocking function there is preferably used a material having a small electrical resistance which can hardly undergo plastic deformation. For example, copper alloys for spring such as phosphor bronze, German silver and beryllium-copper or nickel or nickel alloys are desirable. In particular, the production of an external circuit connector 32 comprising a joint groove 35 as shown in Embodiment 1 can be carried out in a relatively easy manner by a process which comprises press-molding a flat metal plate of a copper alloy for spring into a form having a groove 35 so that the external load connector and the groove 35 are integrally formed.

On the other hand, referring to the requirements for the main material of the internal electrode connector 31, the material must not dissolve because it may come in contact with the electrolyte (e.g., mixture of ethylene carbonate, diethyl carbonate, lithium hexafluorophosphate and lithium perchlorate). As confirmed by publications ("Denkikagaku Binran (Handbook of Electrochemistry)", Maruzen, 1985), copper or nickel has a higher electrode potential in the electrolyte than lithium metal. Therefore, if the internal electrode connector 31 is connected to the negative electrode 2, copper alloys for spring such as phosphor bronze, German silver and beryllium-copper or nickel or nickel alloys can be used similarly to the external circuit connector 32. On the contrary, if the internal electrode connector 31 is connected to the positive electrode 1, these metal materials cannot be used because they exhibit an electrode potential of about 3 V in the lithium battery, which is too low to resist dissolution in the electrolyte. To date, as metal materials which can be connected to the positive electrode 1 there have been experimentally confirmed appropriate aluminum and titanium, which form an oxide layer.

TABLE 1

| | Tensile strength (kg/mm$^2$) | Yield point (kg/mm$^2$) | Young's modulus (kg/mm$^2$) | Electrical resistance ($\mu\Omega \cdot$ cm) |
|---|---|---|---|---|
| Al (annealed) | 4.7 | 1.1 | 7,200 | 2.65 |
| Al (cold-rolled) | 11 | 10 | 7,200 | 2.65 |
| Al (7075) | 58 | — | 7,300 | 5.2 |
| Ni (annealed) | 33 | — | 21,000 | 6–9 |
| Ni (cold-rolled) | 65 | — | 21,000 | 6–9 |
| ENi (cold-rolled) | 55–75 | — | 21,000 | 14 |
| Cu (tough pitch, annealed) | 24 | 4 | 12,500 | 1.67 |
| Cu (tough pitch, cold-rolled) | 45 | 21 | 12,500 | 1.67 |
| Phosphor bronze (5%) | 50–70 | 41–51 | 12,000 | 9.6 |
| German silver | 80–120 | 75–100 | 13,000 | 15–30 |

TABLE 1-continued

| | Tensile strength (kg/mm$^2$) | Yield point (kg/mm$^2$) | Young's modulus (kg/mm$^2$) | Electrical resistance ($\mu\Omega \cdot$ cm) |
|---|---|---|---|---|
| Beryllium-copper (JISH3801) | 120–130 | 110–120 | 12,000 | 15–30 |
| SUS304 (annealed) | 60–70 | 40–50 | 20,500 | 72.3 |
| Industrial Ti (Kroll) 99.2 | 56 | 50.4 | 11,000 | 50 |

Embodiment 2

Figure 4:
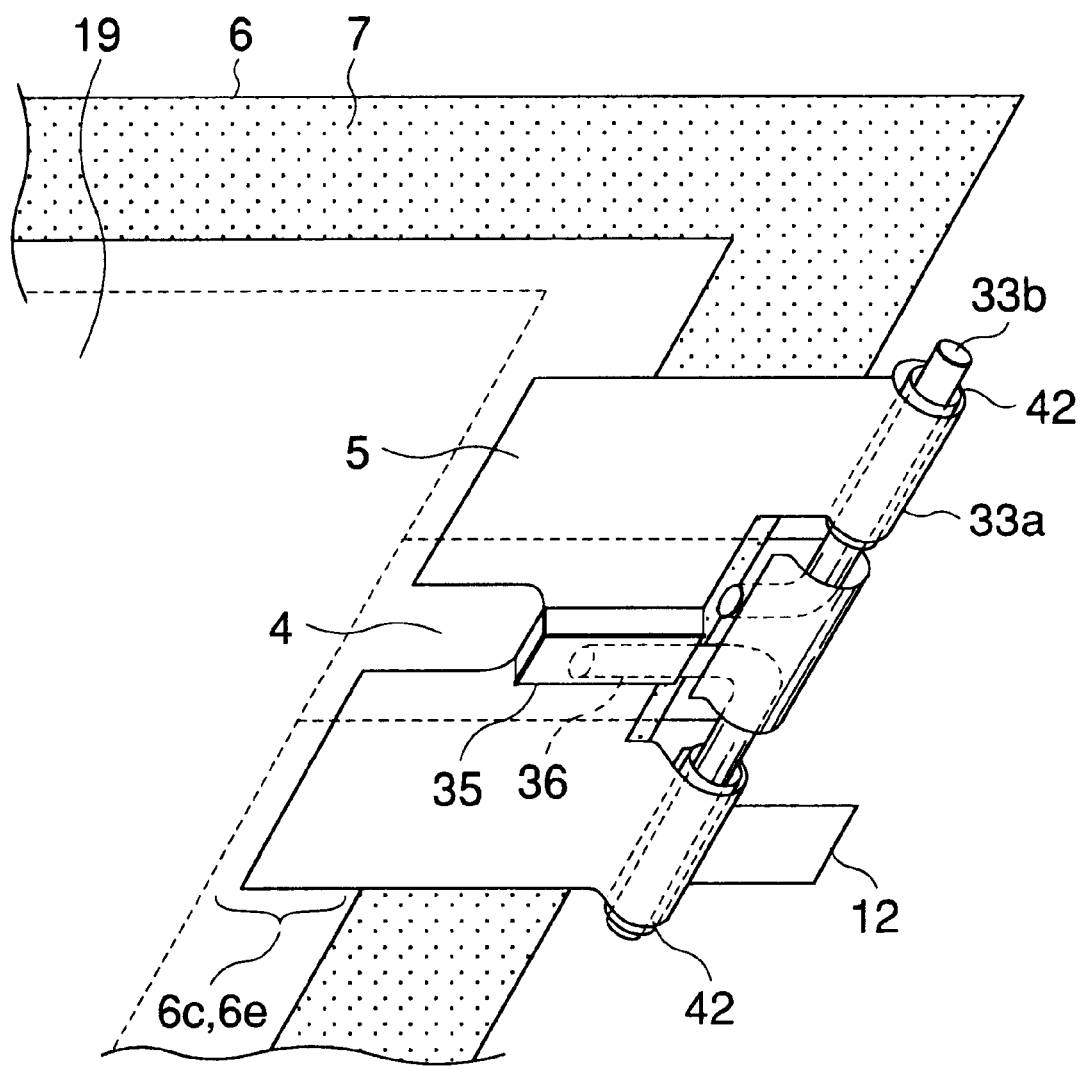
FIG. 4 is a perspective view illustrating an embodiment of the collector tab with a current blocking function according to Embodiment 2 of the present invention.

FIG. 4 concerns Embodiment 2 of the present invention and is a perspective view illustrating another embodiment of the collector tab with a current blocking function. While the groove 35 and rod 36 constituting the joint portion 34 is parallel to the hinge portion 33 in FIG. 2, the groove 35 and rod 36 are perpendicular to the hinge portion 33 in FIG. 4. The other basic structure of the embodiment of FIG. 4 is the same as that of FIG. 2 and thus will not be described herein.

Embodiment 3

Figure 5A:
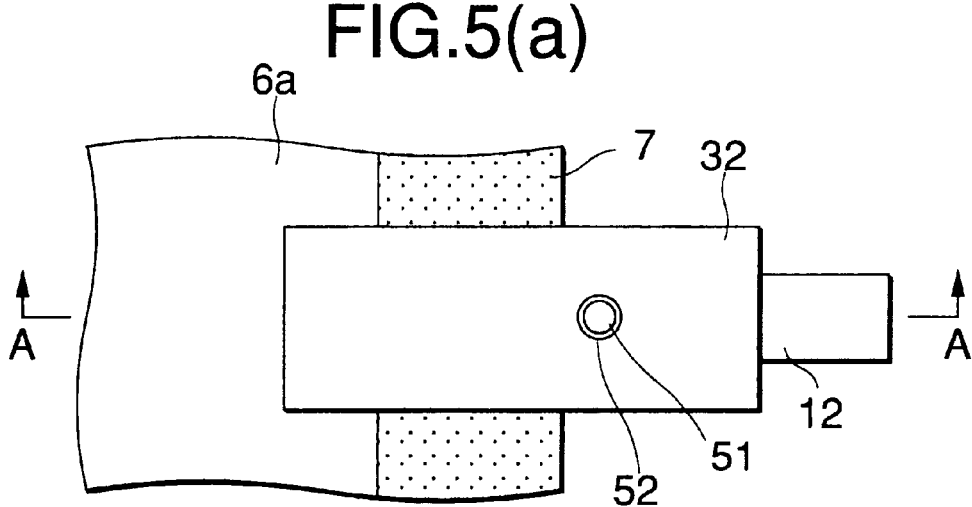
FIG. 5(a) is a plan view of the thin secondary battery.
Figure 5B:
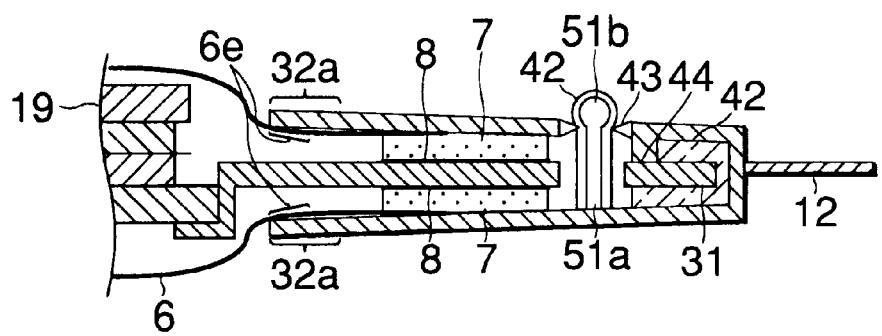
FIG. 5(b) is a sectional view taken on line A—A of FIG. 5(a) illustrating how the battery works during normal charging/discharging.
Figure 5C:
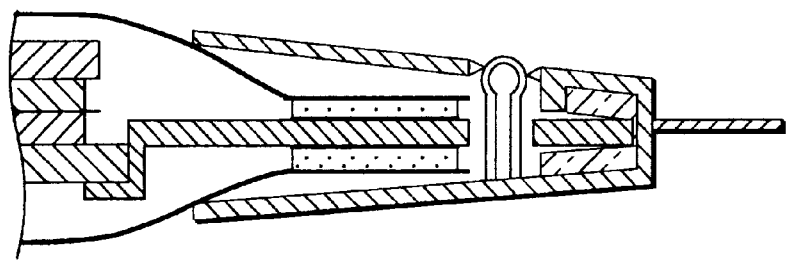
FIG. 5(c) is a sectional view taken on line A—A of FIG. 5(a) illustrating how the collector tab acts to block current passage when the inner pressure of the encapsulating bag rises.

FIG. 5 concerns Embodiment 3 of the present invention and illustrates a further embodiment of the collector tab with a current blocking function. FIG. 5(a) is a diagram as viewed from the top of the collector tab with a current blocking function according to Embodiment 3 of the present invention. FIG. 5(b) is a sectional view taken on line A—A of FIG. 5(a) illustrating how the battery works during normal charging/discharging. FIG. 5(c) is a sectional view taken on line A—A of FIG. 5(a) illustrating how the collector tab acts to block current passage when the inner pressure of the encapsulating bag 6 rises beyond the first predetermined value. In these drawings, the reference numeral 51 indicates a dislocation stop pin, the reference numeral 51a indicates a pin rod, the reference numeral 51b indicates a pin ball, and the reference numeral 52 indicates a dislocation stop round hole. While the joint 34 composed of the groove 35 and the rod 36 and the hinge 33 are used as fastening means in Embodiment 1, a joint composed of the pin ball 51b and the round hole 52 and a leaf spring clip are used as fastening means and the electrical contact surface 44 is provided at a position different from the joint in Embodiment 3.

The external circuit connector 32 in FIG. 5 comprises a round stop hole 52 made in a leaf spring clip formed by bending a springy flat metal plate into a U-shaped form and a negative electrode terminal 12 attached to the leaf spring clip. Further, as shown in FIG. 5(b), the tip of the internal electrode connector 31 is clamped by the two sidewalls of the U-shaped form of the external circuit connector 32 with the electric insulating material 42 provided interposed therebetween. In the middle part of the sidewall of the U-shaped form of the external circuit connector 32, there are a portion retaining electrical contact with the internal electrode connector 31 and a portion for preventing the gap between the two sidewalls of the U-shaped form of the external circuit connector 32 from widening by the action of the dislocation stop pin 51. At the open end 32a of the U-shaped form of the external circuit connector 32, the encapsulating bag is clamped by the two sidewalls of the U-shaped form on the outer surface of the portion 6e thereof between the battery body 19 and the bag sealing portion 7.

When the inner pressure of the encapsulating bag 6 rises to cause the portion 6e to undergo expansion deformation, the gap of the two sidewalls of the U-shaped form of the external circuit connector 32 at the open end thereof widens. When the difference between the inner pressure and the external pressure of the encapsulating bag 6 exceeds a first predetermined value beyond the limit of the dislocation preventive valve 43 for preventing the stop pin 51 from coming off the groove, the stop pin 51 comes off the groove to cause the electrical contact surface 44 to be dislocated. The inner diameter of the round hole 52 made in the external circuit connector 32 itself is greater than the outer diameter of the pin ball 51b. An insulating flexible protrusion made of rubber is attached to the inner side of the round hole 52. In this arrangement, the inner diameter of the round hole 52 is actually smaller than the outer diameter of the pin ball 51b to give a dislocation preventive valve 43. Once the pin ball 51 penetrates the round hole 52, non-conduction can be kept unless the two connectors are re-connected to each other.

The first predetermined value at which the stop pin 51 comes off the dislocation preventive valve 43 to cause the electrical contact surface 44 to be dislocated can be properly adjusted by the strength of the leaf spring clip, the shape of the dislocation preventive pin 51 or the shape or material of the dislocation preventive valve 43.

Embodiment 4

Figure 6A:
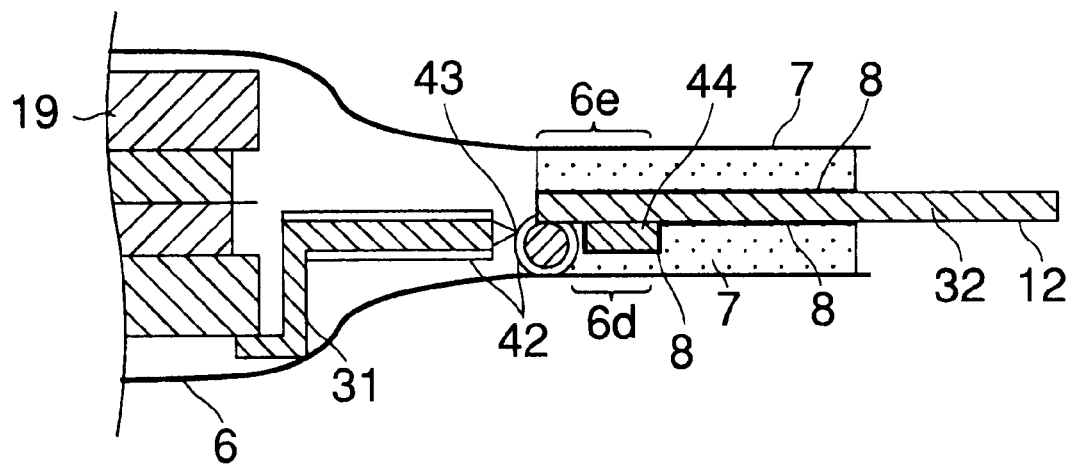
FIG. 6(a) illustrates how the battery works during normal charging/discharging.
Figure 6B:
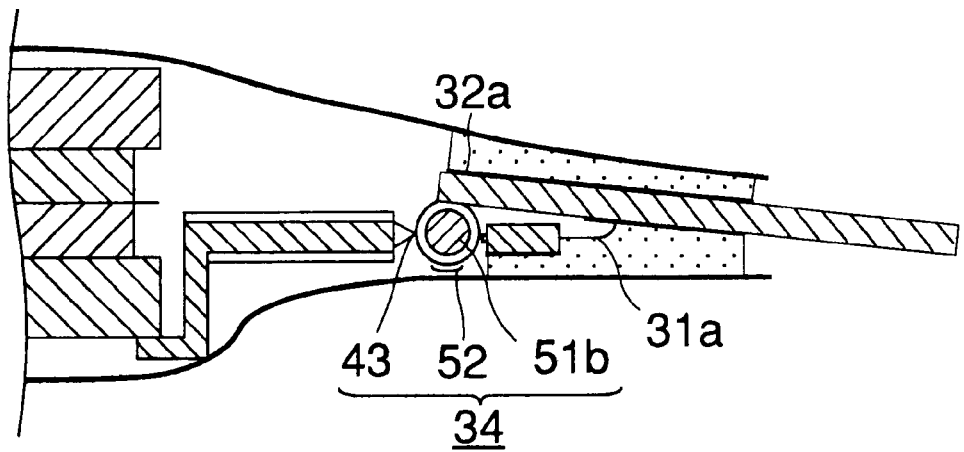
FIG. 6(b) illustrates how the collector tab acts to block current passage when the inner pressure of the encapsulating bag rises.

FIG. 6 concerns Embodiment 4 of the present invention and is a sectional view illustrating a further embodiment of the collector tab with a current blocking function. FIG. 6(a) illustrates how the battery works during normal charging/discharging. FIG. 6(b) illustrates how the collector tab acts to block current passage when the inner pressure of the encapsulating bag rises.

While the joint 34 and the electrical contact surface 44 are provided outside the encapsulating bag 6 in Embodiment 1 or 3, they are provided inside the encapsulating bag 6 in Embodiment 4. The external circuit connector 32 is bonded to the upper and lower inner surfaces of the encapsulating bag 6 at the bag sealing portion 7. However, the external circuit connector 32 is bonded to only the upper inner surface of the encapsulating bag 6 at a portion close to the battery body 19. A pin ball 51b is bonded to the lower inner surface of the encapsulating bag 6 at this portion. When the inner pressure of the encapsulating bag 6 rises, the portion 6e of the encapsulating bag expands upward to push up the tip 32a of the external circuit connector 32, giving a force causing the tip 32a to be separated from the internal electrode connector 31 connected to the lower side of the battery body 19. When the difference between the inner pressure and the external pressure of the encapsulating bag 6 exceeds a first predetermined value, the joint 34 comes off the position to cause the electrical contact surface 44 to be dislocated. The round hole 52 made in the internal electrode connector 31 is greater than the outer diameter of the pin ball 51b. A flexible insulating protrusion made of rubber is attached to the inner side of the round hole 52. In this arrangement, the diameter of the round hole 52 is smaller than the outer diameter of the pin ball 51b to give a dislocation preventive valve 43. Once the pin ball 51b penetrates the round hole 52, non-conduction can be kept unless the two connectors are re-connected to each other.

Embodiment 5

Figure 7A:
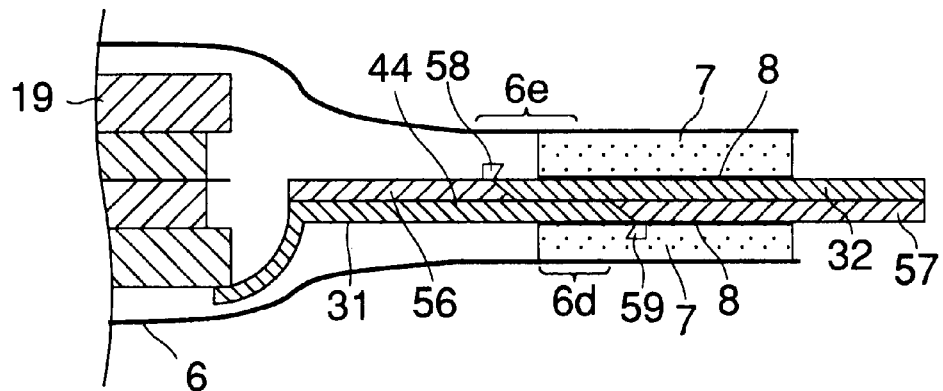
FIG. 7(a) illustrates how the battery works during normal charging/discharging.
Figure 7B:
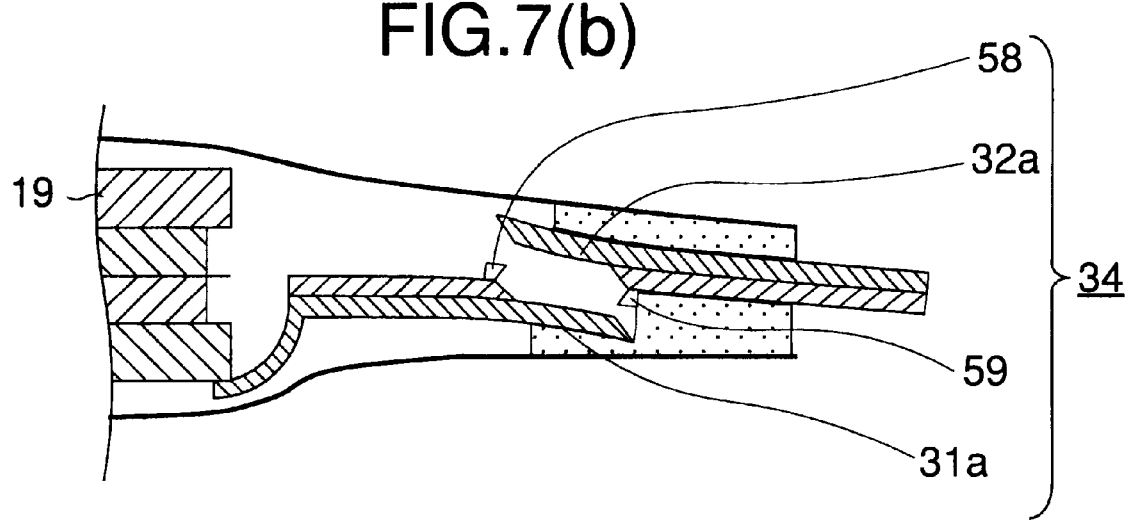
FIG. 7(b) illustrates how the collector tab acts to block current passage when the inner pressure of the encapsulating bag rises.

FIG. 7 concerns Embodiment 5 of the present invention and is a sectional view illustrating a further embodiment of the collector tab with a current blocking function. FIG. 7(a) illustrates how the battery works during normal charging/discharging. FIG. 7(b) illustrates how the collector tab acts to block current passage when the inner pressure of the encapsulating bag rises.

The present embodiment is similar to Embodiment 4 in that the joint 34 and the electrical contact surface 44 are provided inside the encapsulating bag 6 and an arrangement is provided such that the electrical connection between the internal electrode connector 31 and the external circuit connector 32 is broken in response to expansion deformation of the encapsulating bag 6 due to rise in its inner pressure but differs from Embodiment 4 in that the collector tab is additionally provided with a bimetal function. In FIG. 7, the reference numeral 56 indicates a metal plate having a higher thermal expansion coefficient than that of the upper welded part of the internal electrode connector 31. The reference numeral 57 indicates a metal plate having a higher thermal expansion coefficient than that of the lower welded part of the external circuit connector 32. The metal plates 56 and 57 are provided with insulating clicks 58 and 59 at their tip, respectively. These clicks each act as a dislocation stop. The tip 31a of the internal electrode connector 31 and the tip 32a of the external circuit connector 32 are caught and fastened by the clicks 59 and 58, respectively, to retain an electrical contact surface 44 at the area between the clicks 58 and 59.

When the inner pressure of the encapsulating bag 6 rises to cause the encapsulating bag 6 to undergo expansion deformation, the zone between the portion 6e and the portion 32a undergoes upward force while the zone between the portion 6d and the portion 31a undergoes downward force. When the difference between the inner pressure and the external pressure of the encapsulating bag 6 exceeds a first predetermined value, the tip 31a of the inner electrode connector 31 and the tip 32a of the external circuit connector 32 are released from the clicks 58 and 59, respectively, to dislocate the electrical contact surface 44.

Further, when excessive current flows, the resulting heat causes the metal plates 56 and 57 welded to the inner electrode connector 31 and the external circuit connector 32, respectively, to undergo high expansion, allowing the bimetal function to work. As a result, the tip 32a of the external circuit connector 32 warps upward while the tip 31a of the inner electrode connector warps downward to help these tips to be released from the clicks 58 and 58, respectively.

The present embodiment has been described with reference to the arrangement that a bimetal function given by bonding a metal having a higher thermal expansion coefficient than that of the internal electrode connector 31 and the external circuit connector 32 to these connectors, respectively, allows the break of electrical connection between the internal electrode connector 31 and the external circuit connector 32 during the passage of excessive current. However, the internal electrode connector 31 and the external circuit connector 32 may be formed by a shape memory alloy which warps with the rise in ambient temperature.

Further, the foregoing internal electrode connector 31 and the external circuit connector 32 may be formed by a material which deforms with the rise in ambient temperature. The arrangement that the electrical connection between the internal electrode connector 31 and the external circuit connector 32 is broken during the passage of excessive current doesn't necessarily need to be combined with the arrangement that the foregoing electrical connection is broken by making the use of expansion deformation due to the rise in the inner pressure of the encapsulating bag 6. These arrangements may be used singly.

Embodiment 6

Figure 8A:
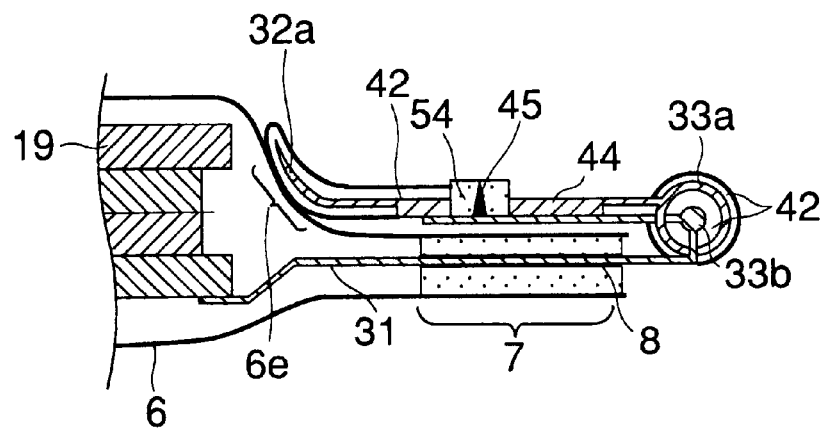
FIG. 8(a) illustrates how the battery works during normal charging/discharging.
Figure 8B:
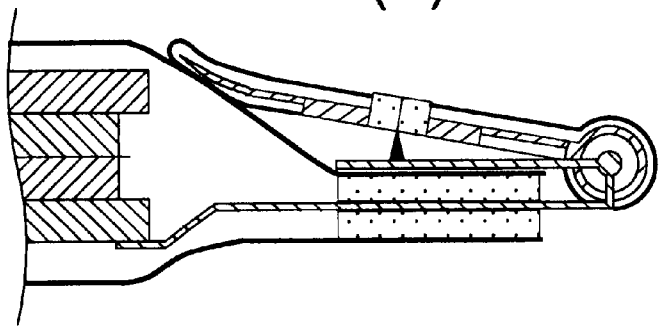
FIG. 8(b) illustrates how the collector tab acts to block current passage when the inner pressure of the encapsulating bag rises.

FIG. 8 concerns Embodiment 6 of the present invention and is a sectional view illustrating a further embodiment of the collector tab with a current blocking function. FIG. 8(a) illustrates how the battery works during normal charging/discharging. FIG. 8(b) illustrates how the collector tab acts to block current passage when the inner pressure of the encapsulating bag rises. In the drawing, the reference numeral 54 indicates a magnet-incorporated sheet. While the joint 34 composed of the groove 35 and the rod 36 is used as one of means for fastening the internal electrode connector 31 and the external circuit connector 32 in Embodiment 1, an iron needle 45 penetrating the depth of the magnet-incorporated sheet is used as a means for fastening the internal electrode connector 31 and the external circuit connector 32 in the present embodiment. The iron needle 45 is fixed by a magnetic force and a frictional force acted thereon. By fastening the internal electrode connector 31 and the external circuit connector 32 in this manner, an electrical contact surface 44 is retained between the internal electrode connector 31 and the external circuit connector 32. When the inner pressure of the encapsulating bag 6 rises to cause the encapsulating bag 6 to undergo expansion deformation, a force is given to move the tip 32a of the external circuit connector 32 upward. When the difference between the inner pressure and the external pressure of the encapsulating bag 6 exceeds a first predetermined value, the resulting force exceeds the magnetic force and frictional force by which the magnet-incorporated sheet 54 is fixed to cause the electrical contact surface 44 to be dislocated.

The present embodiment has been described with reference to the use of the penetrable magnet-incorporated sheet 54. However, the use of an adhesive sheet or a sheet to which the needle 45 sticks by an electrostatic force can provide similar effects Embodiment 7

Figure 9:
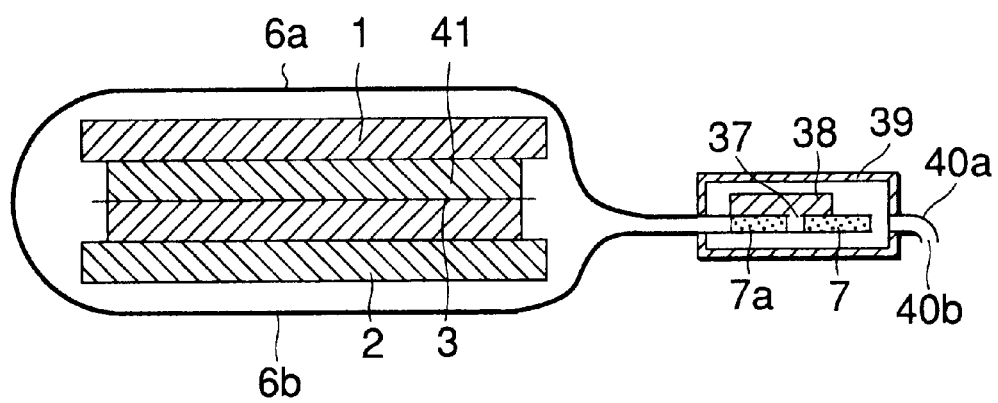
FIG. 9 is a sectional view taken on line B—B of FIG. 1 illustrating the configuration of a thin secondary battery with an evacuation mechanism according to Embodiment 7 of the present invention.

FIG. 9 is a sectional view taken on line B—B of FIG. 1 illustrating how the exhaust and evacuation mechanism according to Embodiment 7 of the present invention works when the inner pressure of the encapsulating bag rises. In the drawing, the reference numeral 7a indicates a portion having a weaker peel strength than the other bag sealing portion and a weaker tensile strength than the base material of the encapsulating bag 6. An expected rupture hole 37 is made on the upper side of the encapsulating bag 6 within this area. A sheet-like liquid-absorbing material 38 is applied to the upper side of the sealing portion 7 in such an arrangement that the expected rupture hole 37 is covered. Further, an exhaust mechanism 39 is provided in such an arrangement that the liquid-absorbing material 38 is covered. The exhaust mechanism 39 is formed by bending a rectangular flat metal plate into a U-shaped form in such an arrangement that the liquid-absorbing material 38 and the sealing portion 7 are contained. Further, the periphery of the flat metal plate is bent inward and fixed in such an arrangement that the sealing portion 7 is contained. Moreover, the exhaust mechanism 39 is provided with an exhaust path 40a and an exhaust outlet 40b.

When the inner pressure of the encapsulating bag 6 rises until the difference between the inner pressure and the external pressure of the encapsulating bag 6 is beyond a second predetermined value, the bag sealing portion 7a having a weak peel strength begins to be peeled off toward the exterior of the bag 6 from the interior of the bag 6. When the peeled point of the bag sealing portion 7a reaches the expected rupture hole 37, gas produced by the reaction of the battery body 19 and the electrolyte begin to leak from the hole 37. The electrolyte is then adsorbed by the liquid-absorbing material 38. The gas is guided by the exhaust induction path 40a in the exhaust mechanism 39 and the exhaust outlet 40b to a proper exhaust point, and then exhausted in such a manner that it doesn't contaminate the interior of the electronic apparatus in which the thin secondary battery is mounted. The second predetermined value can be properly adjusted by the expression between the peel strength of the bag sealing portion 7a and the tensile stress applied to the portion 7a.

As the liquid-absorbing material 38 there may be used a polymer which is dissolved in the electrolyte to reduce the fluidity of the electrolyte, such as homopolymer or copolymer of polyacrylonitrile.

Figure 10A:
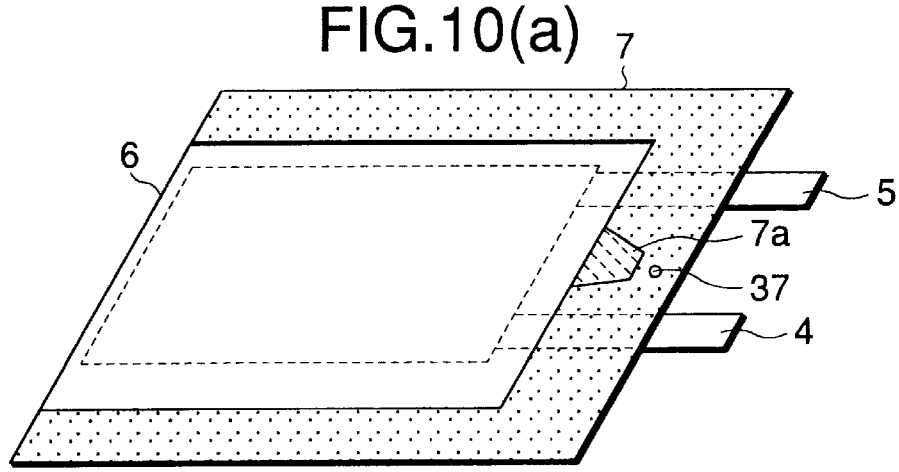
FIG. 10 concerns Embodiment 7 of the present invention and is a perspective view illustrating another embodiment of the region having a weak peel strength.
Figure 10B:
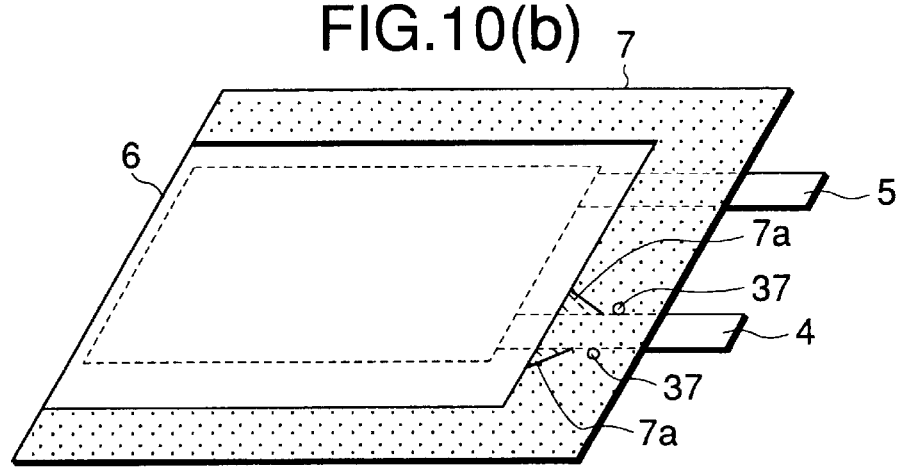

The foregoing description has been made with reference to the provision of the hole 37 on the upper side of the encapsulating bag within the bag sealing portion 7a having a weak peel strength as a method for the determination of the first position on the encapsulating bag 6 to be broken, i.e., expected rupture position. An example showing similar effects even if the hole 37 is not present within the area of the bag sealing portion 7a having a weak peel strength is illustrated in FIGS. 10(a) and (b). The area of the sealing portion 7a having a weak strength shown in FIG. 10(a) is in the form of trapezoid, semicircle or triangle. The sealing portion 7a having a weak strength is formed such that its width narrows toward the exterior of the encapsulating bag 6 from the interior of the encapsulating bag 6. The expected rupture hole 37 is provided on an area extended from the sealing portion 7a. In FIG. 10(b), in order to further secure the arrangement of FIG. 10(a), the sealing portion 7ahaving a weak strength is provided on the periphery of the collector tab 4, and the expected rupture hole 37 is provided on an area extended from the sealing portion 7a having a weak peel strength.

Figure 10C:
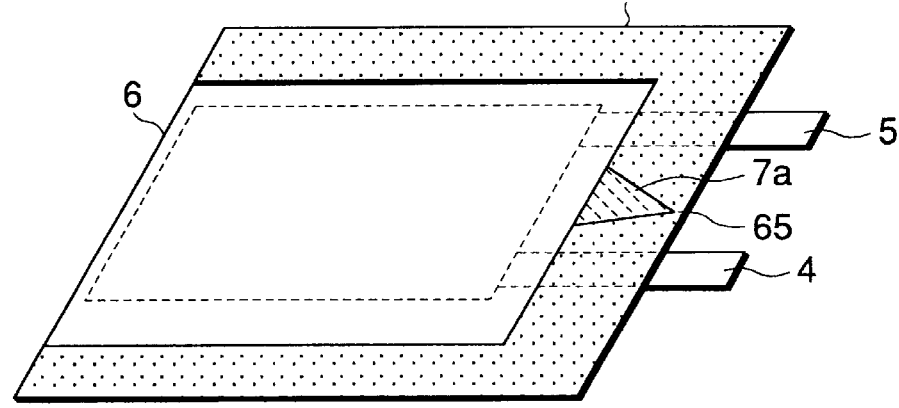

Further, FIG. 10(c) illustrates an example showing similar effects even if there are no expected rupture holes 37. In the drawing, the reference numeral 65 indicates the first position to be broken at the end of the periphery of the encapsulating bag. In the case where the sealing portion 7a having a weak peel strength is in the form of triangle, when the inner pressure of the encapsulating bag 6 rises until the difference between the inner pressure and the external pressure of the encapsulating bag 6 goes beyond the second predetermined value, the bag sealing portion 7 begins to be peeled off toward the apex of the triangle from the interior of the encapsulating bag 6. Finally, the encapsulating bag 6 is broken at the end 65 of the periphery thereof. Further, the liquid-absorbing material 38 and the exhaust mechanism 39 may be provided covering the position 65.

A specific example of the method for the formation of the sealing portion 7a having a weak peel strength if a heat-fusible laminated film is used as a material of encapsulating bag in the foregoing Embodiment 7 will be described. For example, a fluororesin adhesive tape having a thickness of from 10 μm to 200 μm is cut into the shape of 7a. The fluororesin adhesive tape is applied and heat-fused to the outer or inner surface of the encapsulating bag 6. In this manner, the temperature of the heat-fused portion can be lower than that of the other portion during heat-fused sealing. Thus, a sealing portion having a weaker peel portion than the other portion can be formed.

Specific examples of the heat-fused sealing portion having a weak strength (easily peelable) will be described hereinafter. Examples of the portion having a weak peel strength as maximum stress allowing the peeling of the heat-fused portion in the heat fusion-sealed portion include:

a) portion requiring a lower heating temperature during heat-fused sealing than the other heat fusion-sealed portion and having a lower melting temperature than the heat-fusible material;

b) portion requiring a lower moisture content during heat-fused sealing than the other heat fusion-sealed portion;

c) portion which undergoes tensile stress in the direction perpendicular to the orientation direction of the main reinforcing material of the laminating material of the laminated film in the heat fusion-sealed portions which undergo tensile stress when the encapsulating bag undergoes expansion deformation;

d) peripheral portion of the metallic collector tab in the portions which are heat fusion-sealed in such an arrangement that the collector tab is clamped by the laminated film by subjecting the surface of the collector tab to heat fusion; and e) portion having a smaller width of heat-fused seal than the other portion or having a lower density than the other portion due to dotted distribution of heat-fused seal in the portions which are heat fusion-sealed in stripes.

Examples of the portion which undergoes a great peel stress at the heat-fused portion when the encapsulating bag undergoes expansion deformation include:

d) peripheral portion of the metallic collector tab in the portions which are heat fusion-sealed in such an arrangement that the collector tab is clamped by the laminated film by subjecting the surface of the collector tab to heat fusion;

f) position and its side area at the shortest distance from the center of gravity in the peripheral sealed portions on a thin polygonal encapsulating bag, e.g., middle point on the long side, if the thin encapsulating bag is rectangular, and its side area;

g) heat fusion-sealed portion which is at folded point and thus is not used in the case where the majority of the portion which is heat fusion-sealed in stripes is folded; and h) portion on the encapsulating bag which comes in contact with the corner of the battery body or a hard protrusion attached to the battery body when the encapsulating bag undergoes expansion deformation.

The details and basis of these portions having a weak peel strength will be described hereinafter.

Firstly, the strength characteristics of heat fusible laminated film and heat fusion-sealed portion will be described. Table 2 shows the results of the tensile test of specimens of base material 1 and base material 2. The base material 1 is a laminate of a nylon film having a thickness of 15 μm, a polyethylene film having a thickness of 30 μm, a thin aluminum layer having a thickness of 12 μm and a heat-fused polyethylene film having a thickness of 50 μm. The base material 2 has the same structure as the base material 1 except that the thickness of the thin aluminum layer is 15 μm. In general, an oriented material (metal or high molecular compound) exhibits a higher tensile strength in the orientation direction than in the crosswise direction. A laminate of such oriented materials, too, shows the same tendency. The base materials 1 and 2 each showed a tensile strength of about 5% higher in the direction of orientation of thin aluminum layer (longitudinal direction) than in the crosswise direction (lateral direction).

TABLE 2

| Kind of base material of heat-fusible laminated film | Tensile strength [N/mm²] in the direction of orientation of Al layer (longitudinal direction) | Tensile strength [N/mm²] in the crosswise direction (lateral direction) |
|---|---|---|
| Base material 1 (NY15/PE30/Al12/dry/LLDPE50) | 5.36 | 5.16 |
| Base material 2 (NY15/PE30/Al15/dry/LLDPE50) | 4.23 | 4.01 |

Figure 11:
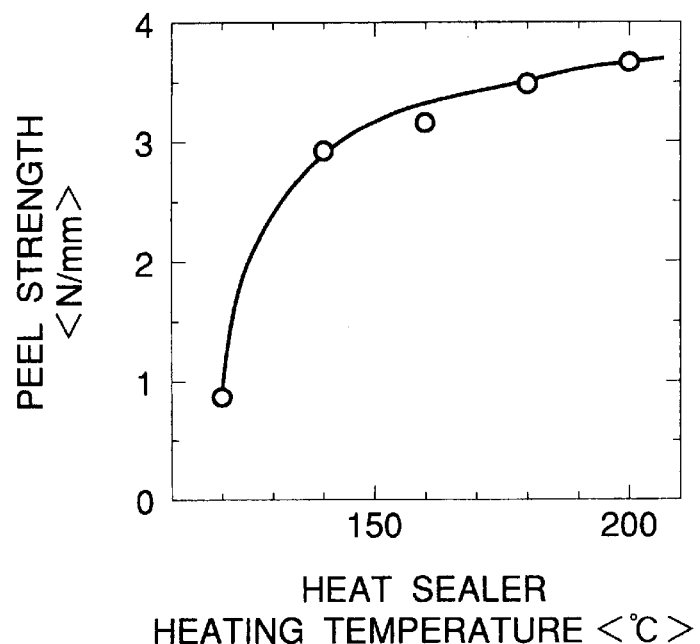
FIG. 11 concerns Embodiment 7 of the present invention and is a graph illustrating the results of test concerning the dependence of the peel strength of the heat fusion-sealed portion on the heating temperature of the heat sealer.
Figure 12:
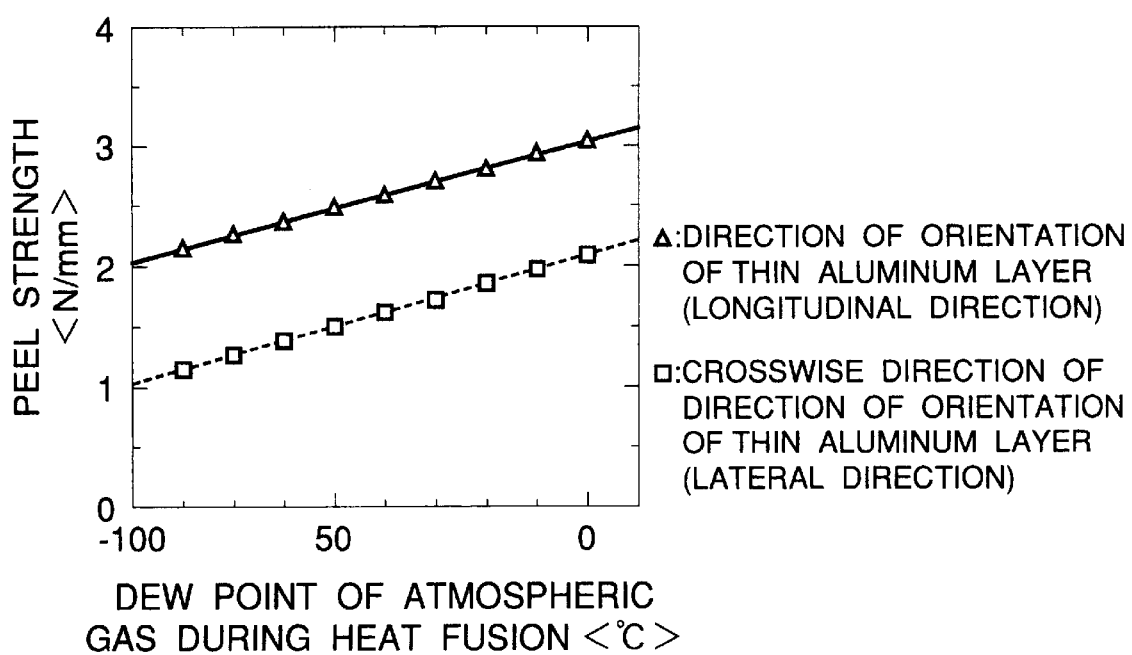
FIG. 12 concerns Embodiment 7 of the present invention and is a graph illustrating the results of test concerning the dependence of the peel strength of the heat fusion-sealed portion on the dew point of the atmospheric gas.

When two sheets of the heat-fusible laminated film are heated to about its melting point (approx. 200° C.) by a heat sealer with the heat-fusible polyethylene layers opposed to each other, the heat-fusible polyethylene layers are fused to each other. FIGS. 11 and 12 show the results of measurement of tensile strength (peel strength) developed when the two sheets of heat-fusible laminated films of the laminate specimen are peeled off each other. FIG. 11 shows the dependence of peel strength on the heating temperature of the heat sealer developed when the base material 1 which has been formed by heat-fused sealing in the atmosphere (heat-fused at a dew point of 10° C.) is subjected to pulling in the longitudinal direction. FIG. 11 demonstrates that within the heat sealer heating temperature range of from 140° C. to 200° C., the heat-fusible polyethylene is gradually less completely fused and shows a less peel strength as the heating temperature falls. In particular, when the heating temperature is not higher than 140° C., the heat-fusible polyethylene shows a rapid drop of peel strength. Even if heat fusion-sealed at a heating temperature of 200° C., the sealed portion exhibits a peel strength as low as 50 to 70% of the tensile strength of the base material 1.

FIG. 12 shows the dependence of peel strength on the dew point of the atmospheric gas during heat fusion developed when the base material 2 which has been formed by heat fusing at a heat sealer heating temperature of 200° C. is subjected to pulling in the direction of heat sealing or in the crosswise direction. FIG. 12 demonstrates that the higher the dew point is, the higher is the peel strength. In other words, it is made clear that when heat fusion-sealed in dried state, the sealed portion lacks of necessary moisture content and thus shows a reduced peel strength. It was also confirmed that the heat-fused specimen exhibits a higher peel strength in the direction of orientation of thin aluminum layer (longitudinal direction) than in the crosswise direction (lateral direction) as in the results of tensile test of the base material.

Figure 13A:
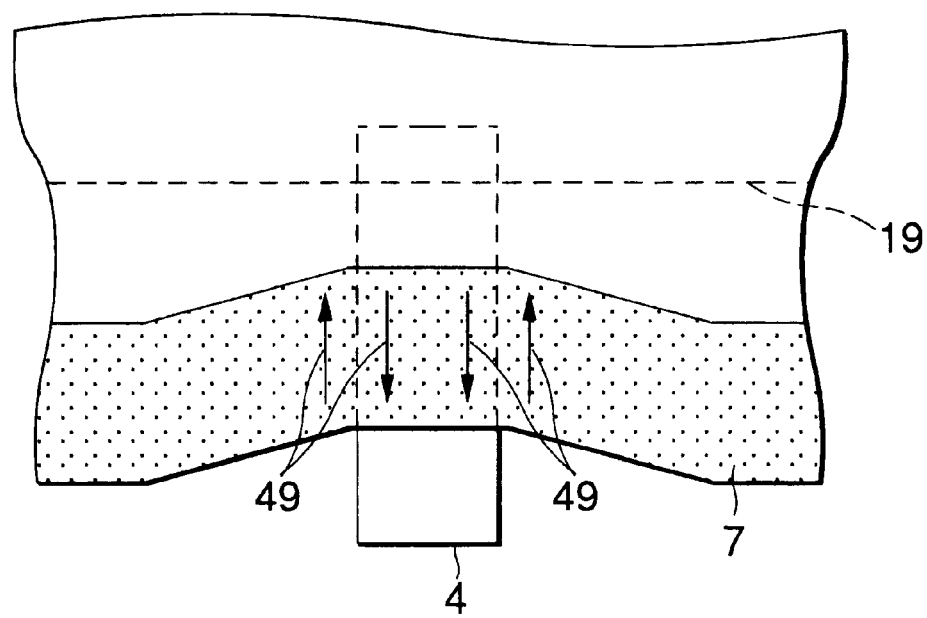
FIG. 13(a) is a plan view.
Figure 13B:
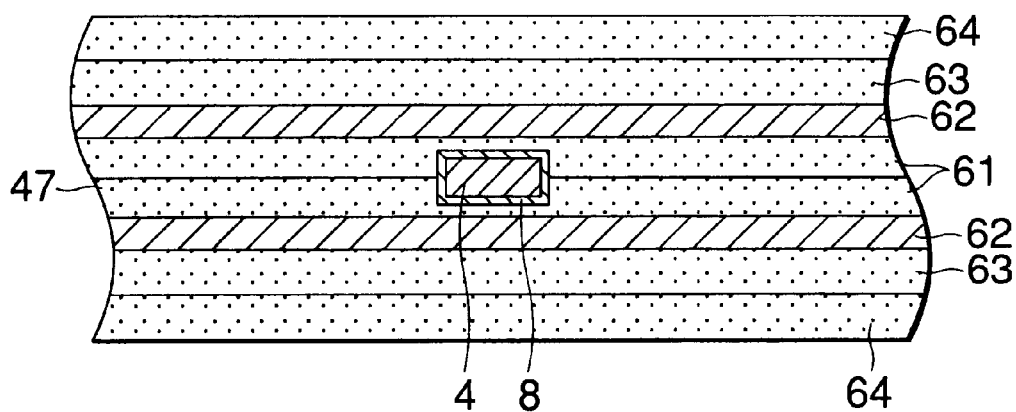
FIG. 13(b) is a sectional view.

FIGS. 13(a) and (b) are a plan view and a sectional view illustrating the peripheral portion of the encapsulating bag to which a collector tab is heat fusion-sealed, respectively. In these drawings, the reference numeral 61 indicates a heat-fusible polyethylene layer, the reference numeral 47 indicates a heat-fused interface, the reference numeral 62 indicates a thin aluminum layer, the reference numeral 63 indicates a polyethylene layer, the reference numeral 64 indicates a nylon layer, and the reference numeral 49 indicates an arrow showing the direction of shearing force applied to the encapsulating bag at the interface of the side wall of the collector tab 4.

In order to heat-fusion seal the heat-fusible polyethylene layers with the metallic collector tab 4 provided interposed therebetween, it is necessary that the metallic surface of the collector tab 4 be coated with a heat-fusible high molecular material such as Bondine (available from Sumika Atochem) and Kuranbeter (available from Kurabo Industries Ltd.). Further, the thickness of the collector tab 4 is preferably less than twice that of the heat-fusible polyethylene layer 61.

In general, when the two heat-fusible polyethylene layers are heat fusion-sealed under pressure by a heat sealer, the heat-fusible polyethylene layer 61 and the coating portion 8 for metal bonding are fused to each other at the heat fusion interface 47. The heat-fusible polyethylene layer 61 has a smaller thickness at the portion of the upper and lower surface of the bonded portion of the collector tab 4 than at the other portion. Therefore, a dislocation occurs in the heat-fusible polyethylene layer 61 at the interface of the side wall of the collector tab 4. Further, when the encapsulating bag undergoes expansion deformation, a shift occurs between the portion bonded to the collector tab 4 and the other portion depending on the degree of expansion deformation to produce a shearing stress 49. Therefore, it is presumed that the periphery of the collector tab has a strength low enough to undergo destruction in the bag sealing portion 7. This was confirmed by the results of pressure rupture test.

The stress applied to the encapsulating bag 6 when it is under inner pressure will be described hereinafter. Firstly, the application of inner pressure to an ordinary thin structure will be described with reference to a publication ("Zairyou Rikigaku (Material Dynamics), 1st Part", Kaibundo, 1984). Supposing that when a minute element dxdy having a thickness t receives an inner pressure p to undergo deformation by a curvature $\rho_1$ in y direction and by a curvature $\rho_2$ in the circumferential direction, it receives tensile stress by a curvature $\sigma_x$ in y direction and by a curvature $\sigma_y$ in the circumeferential direction, the following expression can be established:

$$\sigma_x/\rho_2 + \sigma_y/\rho_1 = p/t \tag{1}$$

From this expression, $$\text{if } \rho_1 \gg \rho_2 \tag{2}$$

$\sigma_x \_ \sigma_2 \cdot p/t$ (equality is made when $\rho_1 = \infty$)

$\sigma_y \leq \rho_2 \cdot 1/(2t)$

In these expressions, equality is made when $\rho_1 = \infty$ and the section of y axis is circular. At this point, the value of $\sigma_x$ coincides with the circumferential stress on a thin-walled cylinder.

Further, $$\text{if } \rho_1 = \rho_2 \tag{3}$$

$\sigma_x = \sigma_y = \rho_1 \cdot p/(2t)$

At this point, the value of $\sigma_x$ coincides with the circumferential stress on a thin-walled sphere.

Figure 14:
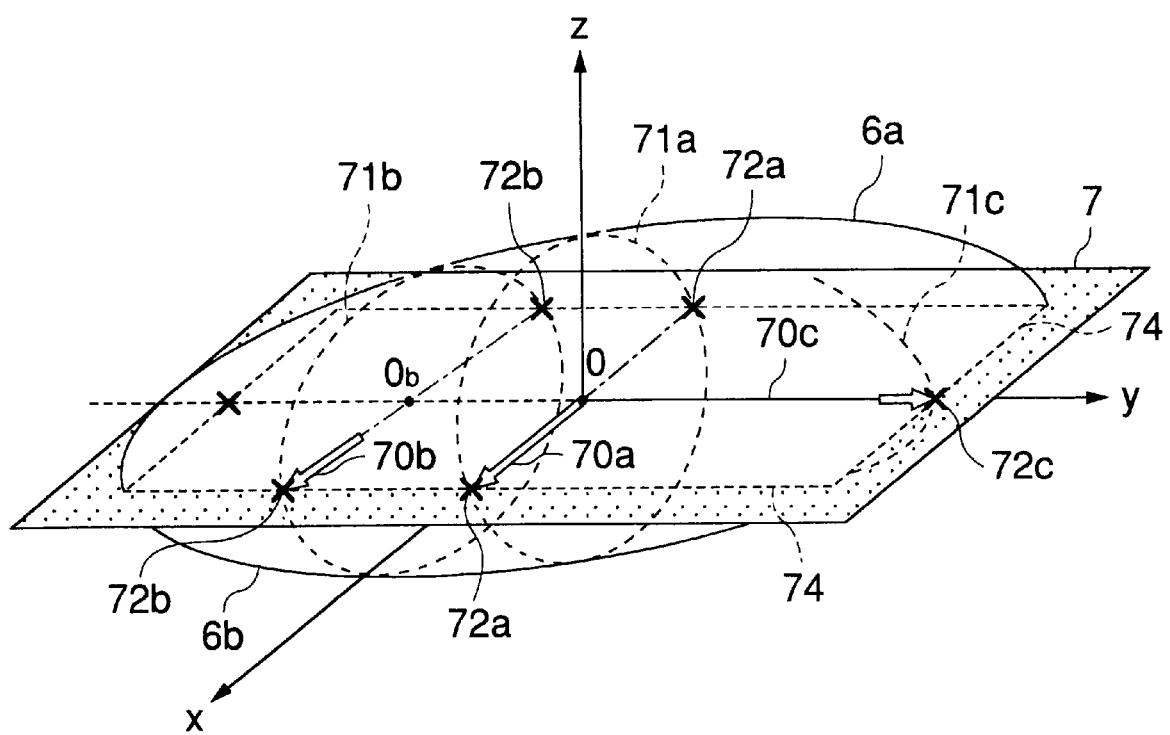
FIG. 14 concerns Embodiment 7 of the present invention and is a diagram illustrating how an encapsulating bag which is sealed at its periphery in rectangular form undergoes expansion deformation when it receives inner pressure.

FIG. 14 is a diagram depicting on experimental results how an encapsulating bag which is sealed at its periphery in rectangular form undergoes expansion deformation when it receives inner pressure. The point O indicates the center of gravity before deformation. The axis y runs longitudinally through the point O. The axis x runs in the crosswise direction through the point O. The axis z runs in the direction of displacement through the point O. The reference numeral 71a indicates xy section (a section) taken through the point O, the reference numeral 71b indicates xy section (b section) taken through the point $O_b$, and the reference numeral 71c indicates yz section (c section) taken through the point O. The reference numerals 72 indicate points at which various expansion sections come in contact with the bag sealing portion 7. In some detail, the reference numeral 72a indicates a contact point of a section, the reference numeral 72b indicates a contact point of b section, and the reference numeral 72c indicates a contact point of c section. The reference numeral 70 indicates the curvature ($\rho$) of expansion section. In some detail, the reference numeral 70a indicates the curvature ($\rho_a$) of a section at the contact point 72a, the reference numeral 70b indicates the curvature ($\rho_b$) of b section at the contact point 72b, and the reference numeral 70c indicates the curvature ($\rho_c$) of c section at the contact point 72c. Since a section undergoes almost circular expansion deformation but b section and c section undergo flat ellipsoidal expansion deformation, the curvature $\rho_a$ of a section is maximum among those of various sections at points 72. Further, since the encapsulating bag can difficultly undergo deformation within xy plane at points 72, the expression (2) can be established. Therefore, it is thought that the maximum stress that causes the bag sealing portion 7 to be peeled off acts on the point 72a. Evaluating two-dimensionally the stress that causes the bag sealing portion to be peeled off and taking only the stress within 71a expansion section (value of $\sigma_x$ in the expression (2)) into account, the inner pressure $p_{max}$ at which the sealing portion begins to be peeled off can be determined by the following expression (4):

$$p_{max} = t \cdot \sigma_{peel} / \rho_a \qquad (4)$$

if the peel strength of the bag sealing portion ($t \cdot \sigma_{peel}$) and the curvature ($\rho_a$) of a section at the point 72a are known. The curvature ($\rho_a$) of a section at the point 72a can be determined by the following expression (5):

$$\rho_2 a = (2 \times \text{length of shorter side} + \text{elongation})/(2\pi) \qquad (5)$$

if the stress elongation characteristics of the bag material are known.

Figure 15A:
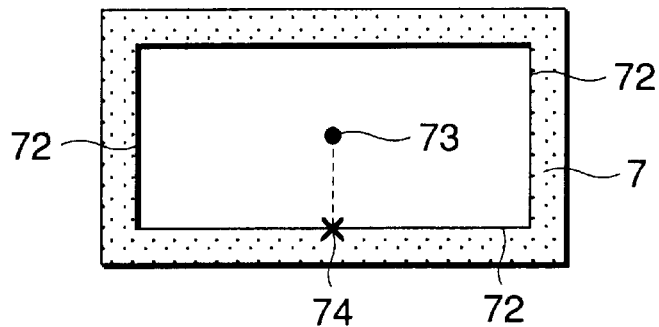
FIG. 15 concerns Embodiment 7 and is a plan view illustrating the center of gravity of an encapsulating bag which is sealed at its periphery in the form of polygon and the contact point on the sealing portion positioned at the shortest distance from the center of gravity.
Figure 15B:
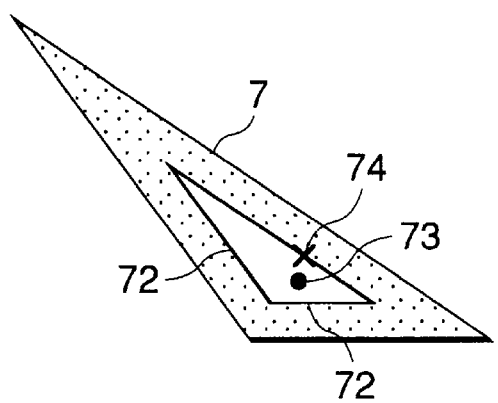
Figure 15C:
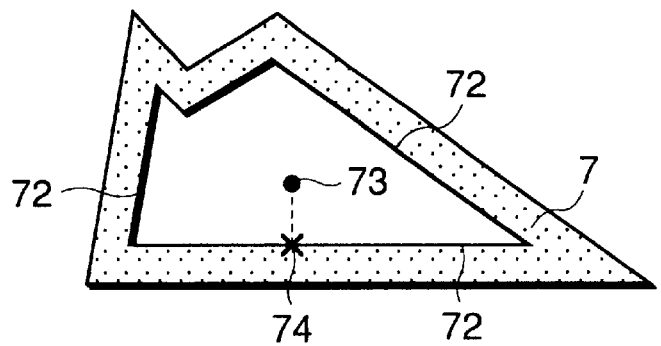

FIGS. 15(a) to (c) each illustrate the center of gravity of an encapsulating bag which is sealed at its periphery in the form of polygon and the point at which the stress that causes the bag sealing portion to be peeled off during expansion deformation is expected to be maximum. In some detail, FIG. 15(a) indicates the case where the encapsulating bag is rectangular, FIG. 15(b) indicates the case where the encapsulating bag is triangular, and FIG. 15(c) indicates the case where the encapsulating bag is pentagonal. In these drawings, the reference numeral 73 indicates the center of gravity of the polygon, and the reference numeral 74 indicates the sealing point on the encapsulating bag positioned at the shortest distance from the center of gravity 73.

We confirmed from the results of pressure rupture tests on many encapsulating bags many cases that the encapsulating bag undergoes maximum expansion deformation in the vicinity of the center of gravity 73 and then begins to break at the sealing portion 7 in the vicinity of the sealing point on the encapsulating bag positioned at the shortest distance from the center of gravity 73. This can be interpreted as follows. Supposing that the bag encapsulating a flat battery body be a flat rigid plate which is fixed at its periphery and undergo maximum deflection at its center of gravity, the line between the point 74 and the center of gravity shows maximum strain among lines between the bag sealing contact point 72 and the center of gravity. Therefore, the bag sealing portion receives maximum tensile stress at the point 74. This interpretation is expected to be normally made on a bag encapsulating a flat polygonal battery body.

Figure 16A:
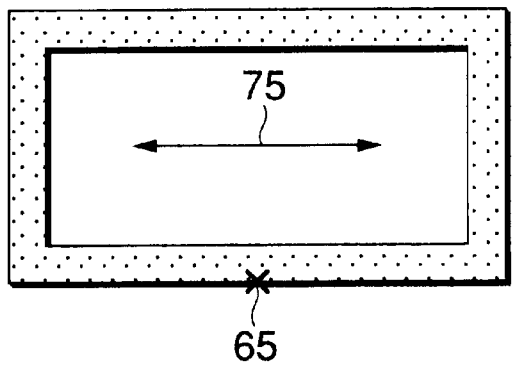
FIG. 16 concerns Embodiment 7 of the present invention and is a plan view illustrating an encapsulating bag which has been subjected to measurement of rupture pressure and its rupture position.
Figure 16B:
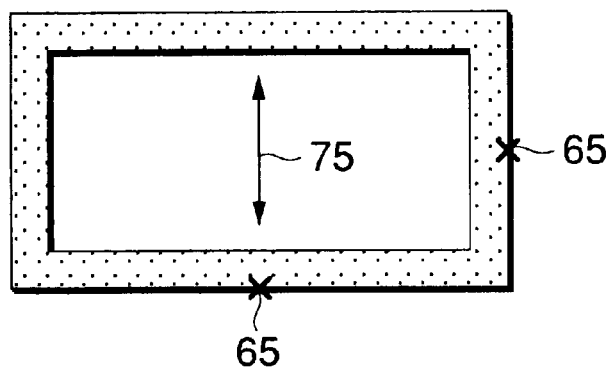
Figure 16C:
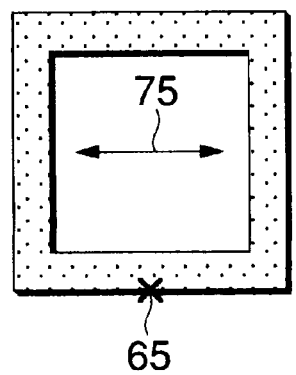

FIG. 16 illustrates the plane figure of an encapsulating bag which has been subjected to measurement of rupture pressure. In some detail, FIG. 16(a) illustrates the case where the plane figure of the encapsulating bag is rectangular (longer longitudinally; ratio of length of long side to that of short side: 2), FIG. 16(b) illustrates the case where the plane figure of the encapsulating bag is rectangular (longer crosswise; ratio of length of long side to that of short side: 2), and FIG. 16(c) illustrates the case where the plane figure of the encapsulating bag is square. In these drawings, the reference numeral 65 indicates the first position on the periphery of the seal at which the encapsulating bag breaks, and the reference numeral 75 indicates the direction of orientation of the main reinforcing material of the laminated film.

Figure 17:
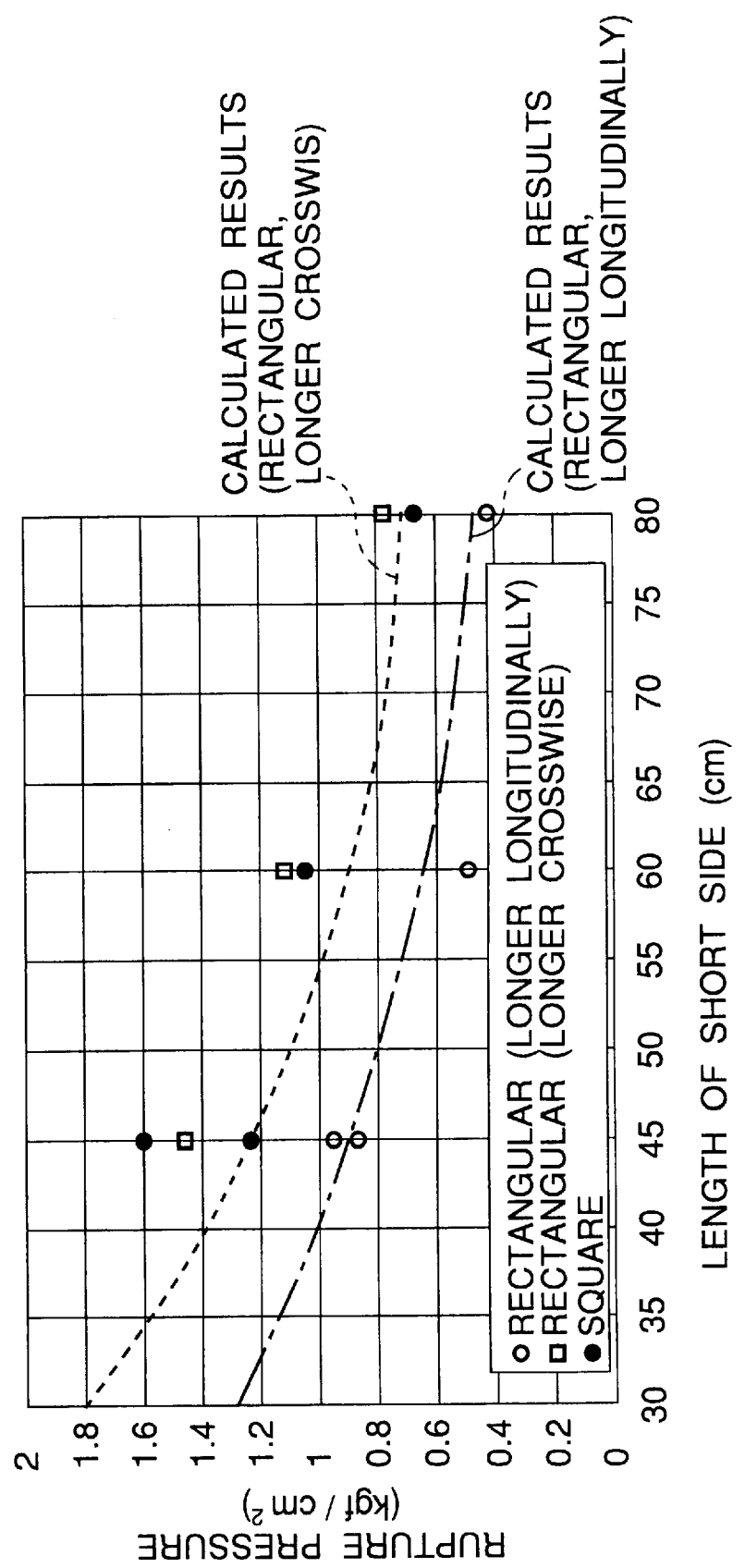
FIG. 17 concerns Embodiment 7 of the present invention and is a graph illustrating the results of rupture pressure measuring test.

FIG. 17 shows the results of rupture pressure determined by applying inner pressure to square, rectangular (longer longitudinally; ratio of length of long side to that of short side: 2) and rectangular (longer crosswise; ratio of length of long side to that of short side: 2) encapsulating bags prepared by heat-sealing a laminated film of base material 2 in the atmosphere. FIG. 17 also shows the results of rupture pressure of rectangular (longer longitudinally) and rectangular (longer crosswise) expected according to the expression (4).

In the case of the rectangular (longer longitudinally) encapsulating bag, the rupture position 65 always occurred in the vicinity of the middle point on the long side of the sealing portion. In this case, the long side of the sealing portion coincides with the side of the sealing portion having a weak strength (sealing portion than can be pulled crosswise). Further, the rupture pressure almost coincided the expected results. In the case of the rectangular (loner crosswise) encapsulating bag, the rupture position occurred in the vicinity of the middle point on either the short side or long side. In this case, since the long side of the sealing portion doesn't coincide with the side of the sealing portion having a weak strength (sealing portion than can be pulled crosswise), the rupture position is indefinite. In the case of the square encapsulating bag, it underwent rupture in the vicinity of the middle point 65 corresponding to the sealing portion having a weak strength. The rupture pressure was about twice that of the rectangular (long longitudinally) encapsulating bag. From these results, it can be presumed that the square encapsulating bag undergoes expansion deformation nearly in the manner of spherical encapsulating bag rather than cylindrical encapsulating bag as proved by the fact that the curvature in the vicinity of the middle point at various sides satisfy the expression (3) ($\rho_1 = \rho_2$).

Figure 18:
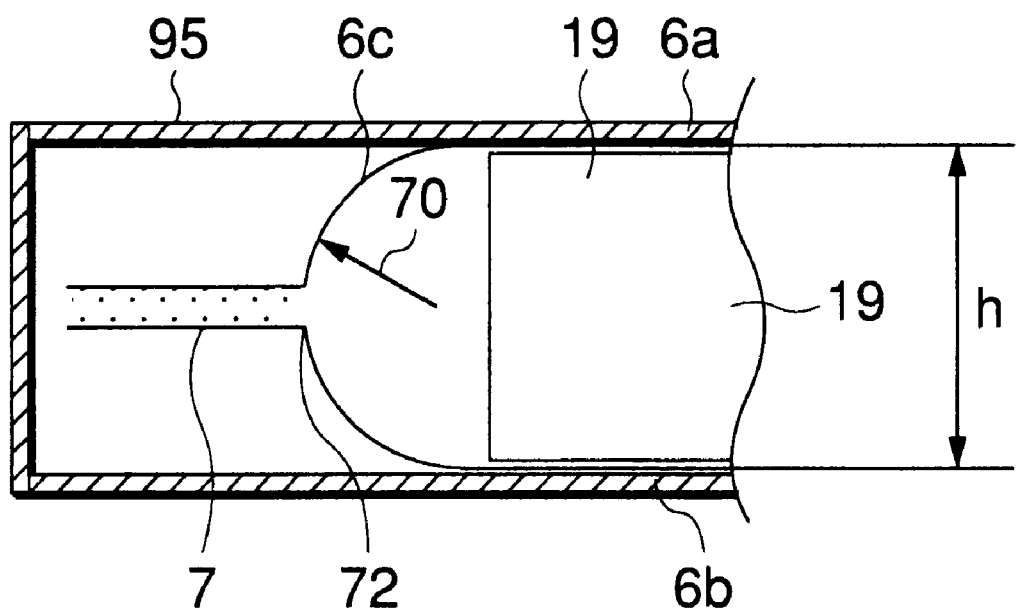
FIG. 18 concerns Embodiment 7 of the present invention and is a sectional view illustrating how a rectangular encapsulating bag undergoes expansion deformation at its periphery with a thin secondary battery kept contained in a container when the inner pressure of the encapsulating bag rises.
Figure 19A:
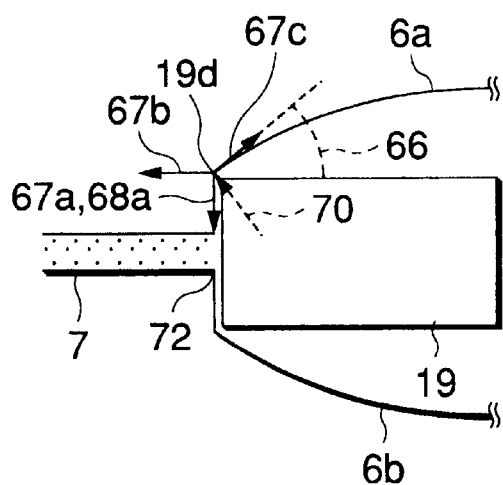
FIG. 19 concerns Embodiment 7 of the present invention and is a diagram illustrating how the encapsulating bag undergoes expansion deformation when the bag comes in contact with the side surface of the battery body at its periphery during the rise in the inner pressure.
Figure 19B:
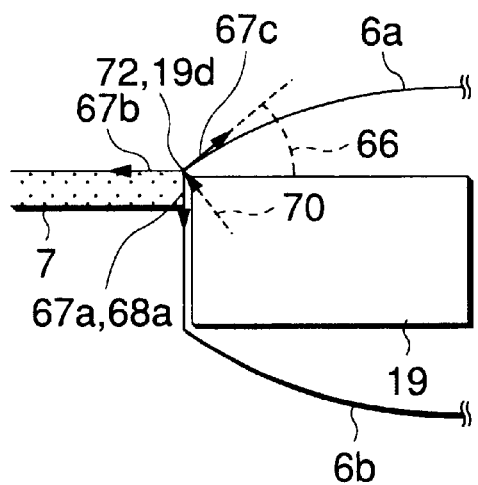
Figure 19C:
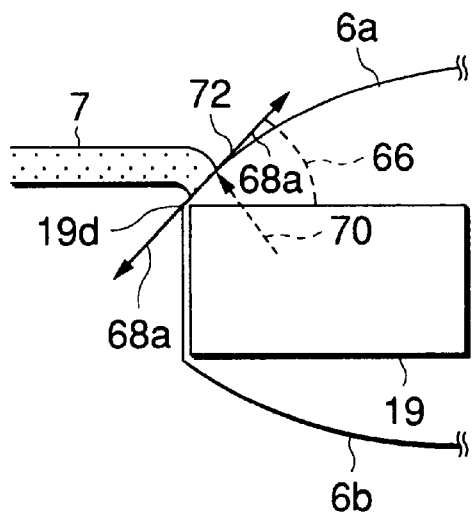
Figure 19D:
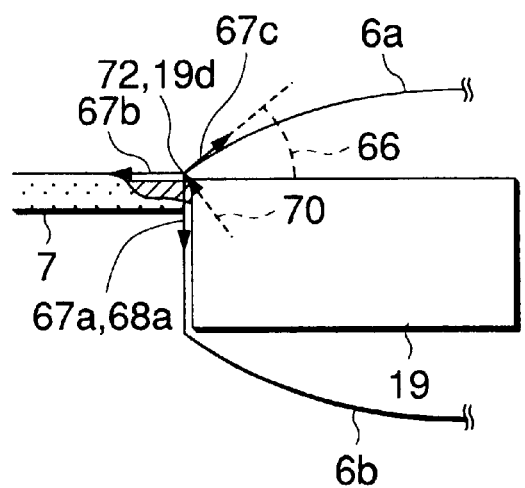

Let us next consider the case where expansion deformation of encapsulating bag is restricted. FIG. 18 illustrates how a rectangular encapsulating bag undergoes expansion deformation with a thin secondary battery kept contained in a container having a height h. In FIG. 18, the reference numeral indicates a container. In this case, the encapsulating bag expands in the form of semicylinder with a curvature of 2/h at its periphery. The tensile stress applied to the contact point 72 with the sealing portion can be calculated from the following expression (6):

$$\sigma_{x\_h} \cdot p/(2t) \qquad (6)$$

which is given by substituting h/2 for $\rho_2$ in $\sigma_{x\_} \sigma_2 \cdot p/t$ (2). The peel stress applied to the heat-fused portion is drastically smaller than that in the case where there are no restrictions as described in connection with FIG. 14. However, the rupture pressure is drastically greater than that in the case where there are no restrictions. Therefore, this case further requires a safety mechanism for evacuating the encapsulating bag.

As mentioned above, the rupture pressure (second predetermined value) of the shape of the encapsulating bag to which the expressions (2) to (6) can be applied can be determined in the stage of design.

FIG. 19 schematically illustrates how the periphery of the encapsulating bag comes in contact with the side surface of a rectangular battery body 19 when the inner pressure of the encapsulating bag rises. This condition can occur when the material of the encapsulating bag can be difficultly elongated or the inner pressure of the encapsulating bag is small. In some detail, FIG. 19(a) indicates the case where the contact point 72 of the section of expanded encapsulating bag with the bag sealing portion is positioned at the side surface of the battery body 19 and the base material of the encapsulating bag comes in contact with the corner of the battery body 19. FIG. 19(b) illustrates the case where the contact point 72 of the section of expanded encapsulating bag with the bag sealing portion comes in contact with the corner of the battery body 19. FIG. 19(c) indicates the case where the contact point 72 of the section of expanded encapsulating bag with the bag sealing portion is positioned on the top surface of the battery body 19 and the base material of the encapsulating bag comes in contact with the corner of the battery body 19. FIG. 19(d) illustrates the case where the contact point 72 of the section of expanded encapsulating bag with the bag sealing portion comes in contact with a protrusion on the battery body 19. In FIG. 19, the reference numeral 19d indicates the corner made by the top surface and the side surface of the battery body 19, and the reference numeral 66 indicates the angle (θ) made by the encapsulating bag and the corner 19d. The reference numeral 67a indicates the tensile stress applied to the side surface of the encapsulating bag at the point 19d, the reference numeral 67b indicates the shearing stress applied to the side surface of the encapsulating bag at the point 19d, the reference numeral 67c indicates the tensile stress ($\sigma_{67c}$) applied to the top surface of the encapsulating bag at the point 19d, the reference numeral 68a indicates the tensile stress ($\sigma_{67c}$) applied to the sealing portion of the encapsulating bag at the point 72, the reference numeral 68b indicates the shearing stress applied to the sealing portion of the encapsulating bag at the point 72, and the reference numeral 69 indicates a hard protrusion provided on the periphery of the battery body. The expression (2) gives $\sigma_{67c}=\sigma \cdot p/t$. The tensile stress ($\sigma_{68a}$) applied to the sealing portion at the point 72 is $C_{67}c\sin\theta$ in FIGS. 19(a) and 19(b). This is a relaxed value as compared with $\sigma_{67c}$. In FIG. 19(c), a shearing stress ($\sigma_{68a}=\sigma_{67c}\cos\theta$) is applied to the sealing portion at the point 72. It is presumed that the structure of FIG. 19(c) can break more easily than ordinary due to this shearing stress. Further, FIG. 19(d) indicates the case where the sealing portion of the encapsulating bag comes in contact with the hard protrusion 69 on the battery body 19 at the contact portion 72. Such a hard protrusion 69 corresponds to the collector plate or collector tab of the electrode.

Figure 20A:
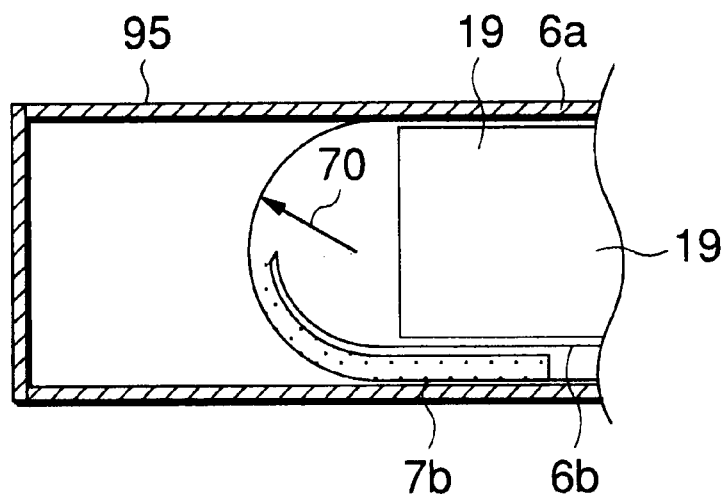
FIG. 20(a) is a sectional view illustrating the encapsulating bag of FIG. 18 bent at the bag sealing portion.
Figure 20B:
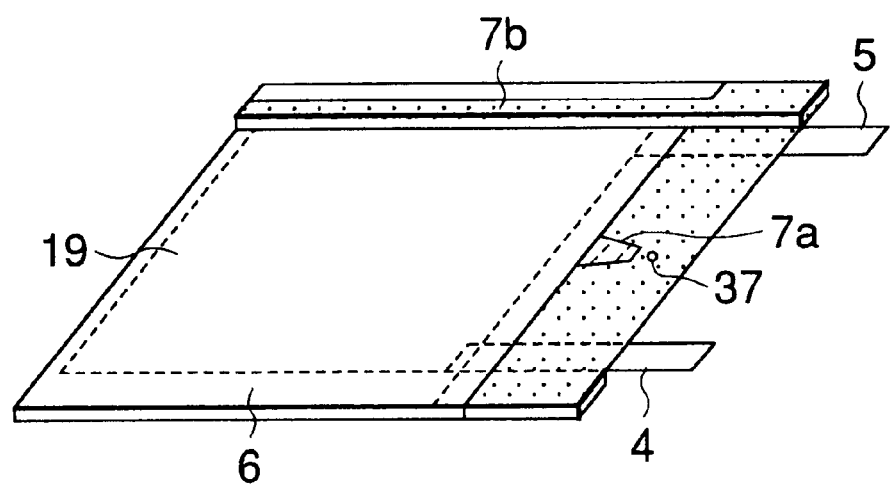
FIG. 20(b) is a perspective view illustrating the encapsulating bag of FIG. 10(a) bent at the bag sealing portion.

FIG. 20 illustrates the case where the bag sealing portion is bent. In some detail, FIG. 20(a) is a sectional view illustrating how the encapsulating bag undergoes expansion deformation with the bag sealing portion of FIG. 18 bent. FIG. 20(b) illustrates the encapsulating bag shown in FIG. 10(a) bent at the sealing portion. In these drawings, the reference numeral 7b indicates the bent portion of the bag sealing portion. Even when the inner pressure of the encapsulating bag rises to cause the encapsulating bag to undergo expansion deformation, the bent portion 7b receives a tensile stress that causes itself to be peeled off as well as a frictional force that prevents the sealing portion from moving, making it difficult to peel the sealing portion. Therefore, by bending the sealing portion at the side free of expected rupture hole 37 as shown in FIG. 20(b), the first position to be broken can be predetermined more certainly than in FIG. 10(a).

Embodiment 8

The heat fusion-sealed portion having a weak strength has been described. The order of sealing suitable for predetermining the first position to be broken during the rise in inner pressure in the case where the thin secondary lithium battery is sealed with a heat-fusible laminated film will be described hereinafter. If the secondary lithium battery is sealed in this manner, care must be taken to see that the water content in the encapsulating bag falls below scores of ppm.

FIGS. 21(a) to (g) illustrate in a tree diagram an appropriate order of various steps of sealing a thin secondary lithium battery in the form of rectangle. In these drawings, the reference numeral 75 illustrates the direction of orientation of the main reinforcing material, the reference numeral 76 illustrates one of the long sides of tie rectangular encapsulating bag which doesn't undergo heat-fused sealing, the reference numeral 77 indicates the other long side of the rectangular encapsulating bag which undergoes heat-fused sealing, the reference numeral 78 indicates a fluororesin sheet, the reference numeral 79 indicates an opening for injection of electrolyte, and the reference numeral 80 indicates an electrolyte injector.

In Embodiment 8, the procedure proceeds in the order of FIGS. 21(a), (b), (c), (d), ($e_1$), ($f_1$) and ($g_1$). FIG. 21(a) illustrates the base material of a rectangular heat-fusible laminated film bent in such an arrangement that the side 76 and the direction 75 of orientation of the main reinforcing material are parallel. An expected rupture hole 37 has been previously made in the long side 77 to be heat fusion-sealed in the vicinity of the middle point thereof. FIG. 21(b) illustrates a three side-closed bag formed by heat fusion-sealing the two short sides of the laminated film. FIG. 21(c) illustrates the three side-closed bag having a battery body 19 with a collector tab inserted thereinto. FIG. 21(d) illustrates the encapsulating bag heat fusion-sealed at the long side 77 with a fluororesin sheet 76 applied to the inner surface thereof at the area on the periphery of the bag including the portion 7a having a weak peel strength through which the interior of the bag is exposed to the atmosphere. FIG. 21($e_1$) illustrates how the electrolyte is injected from an electrolyte injector 80 into the bag through an opening 79 formed by pulling out the fluororesin sheet 78. FIG. 21($f_1$) illustrates the encapsulating bag with the fluororesin sheet 78 having a shape corresponding to the portion 7a applied to the external surface of the bag. FIG. 21($g_1$) illustrates the encapsulating bag which has been again heat fusion-sealed at the long side 77 in such an arrangement that the expected rupture hole 37 lies in the region of the portion 7a having a weak peel strength to which a great peel stress can be applied.

In Embodiment 8, the procedure is carried out through the step of FIG. 21(b) under low dry condition (e.g., in the atmosphere). All the subsequent steps, i.e., steps of FIGS. 21(c) to ($g_1$) are carried out under high dry condition (e.g., dew point of about −90° C.). In this manner, the battery body 19 can be prevented from being exposed to low dry condition.

Embodiment 9

In Embodiment 9, the procedure proceeds in the order of FIGS. 21(a), (b), (c), (d), ($e_1$) and ($g_2$). As in FIG. 21($g_1$), FIG. 21($g_2$) illustrates the encapsulating bag which has been again heat fusion-sealed at the long side 77 in such an arrangement that the expected rupture hole 37 lies in the region of the portion 7a having a weak peel strength to which a great peel stress can be applied. However, FIG. 21($g_2$) differs from FIG. 21($g_1$) in that the portion 7a is shaped such that it runs through the periphery of the encapsulating bag.

In Embodiment 9, the procedure is carried out through the step of FIG. 21(d) under low dry condition (e.g., in the atmosphere). The subsequent steps, i.e., steps of FIGS. 21($e_1$) and ($g_2$) are carried out under high dry condition (e.g., dew point of about −90° C.). In this manner, the step of FIG. 21($f_1$) can be omitted. However, it is necessary at the step of FIG. 21($e_1$) that the encapsulating bag be allowed to stand under high dry condition for an extended period of time so that the battery body 19 is thoroughly dried.

Embodiment 10

In Embodiment 10, the procedure proceeds in the order of FIGS. 21(a), (b), (c), ($e_2$), ($f_2$) and ($g_1$). FIG. 21($e_2$) illustrates how the electrolyte is injected into the three side-closed bag through the unsealed portion, i.e., long side 77. As in FIG. 21($f_1$), FIG. 21($f_2$) illustrates the encapsulating bag with the fluororesin sheet 78 having a shape corresponding to the portion 7a applied to the external surface of the bag. However, FIG. 21($f_2$) differs from FIG. 21($f_1$) in that the long side 77 is quite unsealed.

In Embodiment 10, the procedure is carried out through the step of FIG. 21(b) under low dry condition (e.g., in the atmosphere). All the subsequent steps, i.e., steps of FIGS. 21 (c) to ($g_1$) are carried out under high dry condition (e.g., dew point of about −90° C.). In this manner, the battery body 19 can be prevented from being exposed to low dry condition.

Embodiment 11

FIGS. 22(a) to (g) illustrate in a tree diagram an appropriate order of various steps of sealing a thin secondary lithium battery in the form of rectangle. While the collector tabs 4 and 5 attached to the battery body 19 are positioned at the long side 77 of the rectangle in FIG. 21, they are positioned at the short side of the rectangle in FIG. 22.

FIG. 22(b) illustrates the laminated film bent with the battery body 19 with collector tabs placed interposed therebetween. FIG. 22(c) illustrates a three side-closed bag formed by heat fusion-sealing the laminated film with the collector tabs attached to the battery body 19 positioned interposed therebetween at the short side. Since FIGS. 22(a) to (g) illustrate the same procedure as those having the same symbols in FIG. 21 except the foregoing differences, the description of these drawings is omitted.

The advantage of Embodiment 11 is that the collector tabs 4 and 5 are positioned at the short side of the laminated film because they are preferably as remote from the expected rupture hole 37 as possible except for the case where the position of the expected rupture hole 37 is determined to the vicinity of the collector tabs 4 and 5.

If the procedure of FIG. 22 proceeds in the order of (a), (b), (c), (d), ($e_1$), ($f_1$) and ($g_1$), which corresponds to that of Embodiment 8, or in the order of (a), (b), (c), ($e_2$), ($f_2$) and ($g_1$), which corresponds to that of Embodiment 10, the step of FIG. 22(a) is carried out under low condition (e.g., in the atmosphere). All the subsequent steps, i.e., steps of FIGS. 22(b) to ($g_1$) are carried out under high dry condition (e.g., dew point of about −90° C.). In this manner, the battery body 19 can be prevented from being exposed to low dry condition.

If the procedure of FIG. 22 proceeds in the order of (a), (b), (c), (d), ($e_1$) and ($g_2$), which corresponds to that of Embodiment 9, the steps of FIGS. 22(a) to (d) are carried out under low condition (e.g., in the atmosphere). The steps of FIGS. 22($e_1$) and ($g_2$) are carried out under high dry condition (e.g., dew point of about −90° C.). In this manner, the step of FIG. 22 ($f_1$) is omitted. However, it is necessary at the step of FIG. 22($e_1$) that the encapsulating bag be allowed to stand under high dry condition for an extended period of time so that the battery body 19 is thoroughly dried.

Embodiment 12

Figure 23:
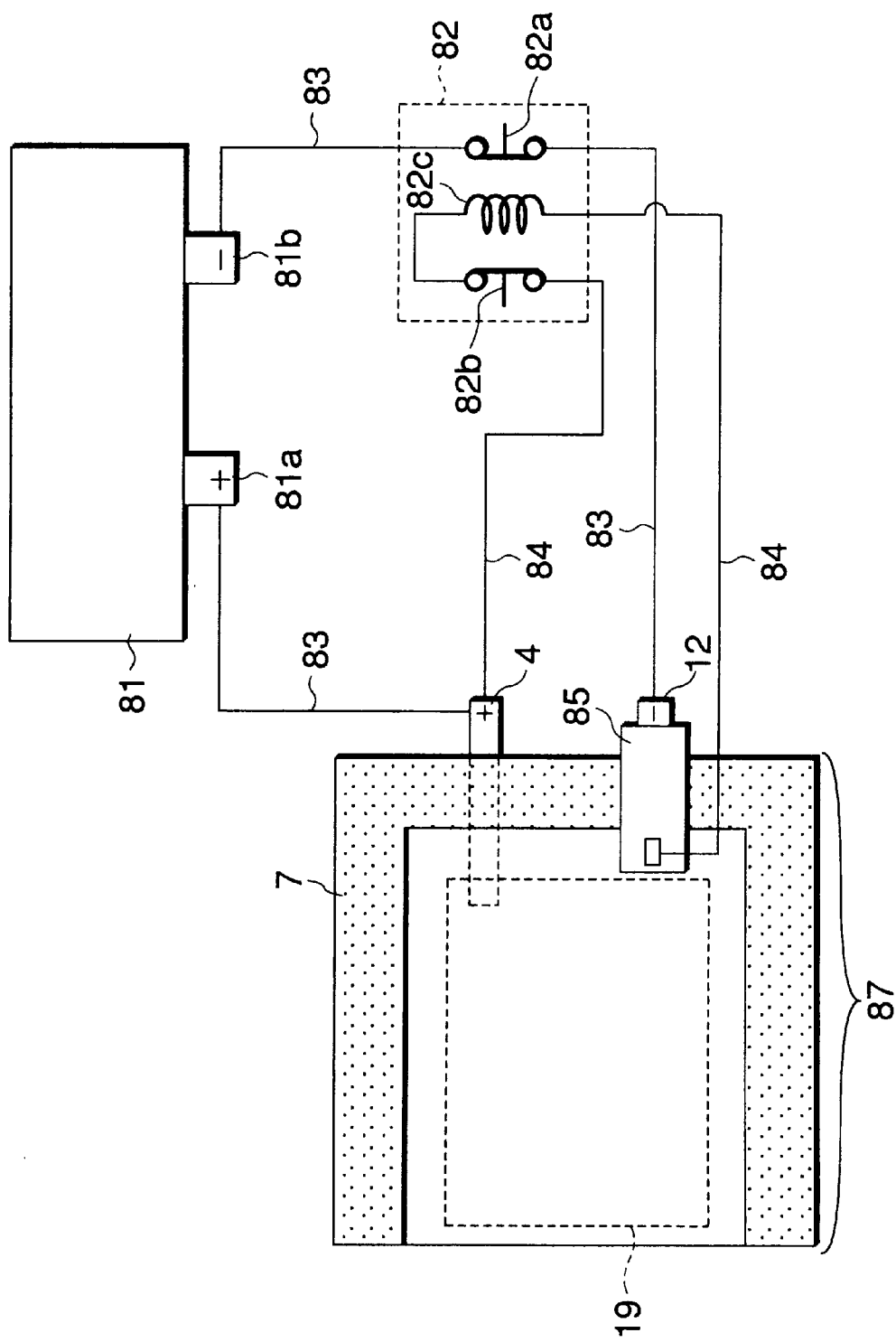
FIG. 23 is a diagram illustrating a thin secondary battery according to Embodiment 12 of the present invention.
Figure 24:
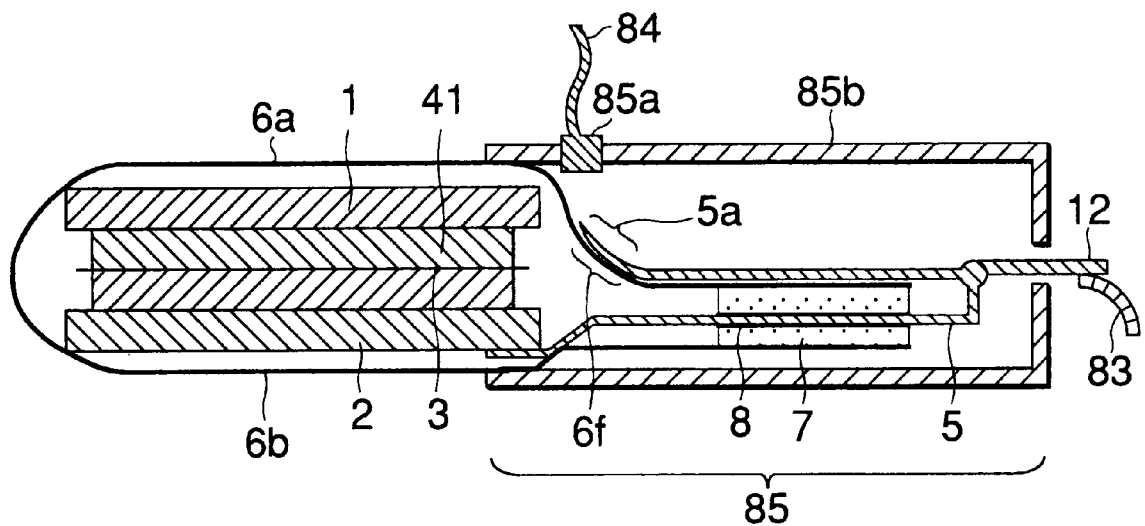
FIG. 24 is a sectional view illustrating the configuration of a current opening/closing switch according to Embodiment 12 of the present invention.

FIG. 23 is a diagram illustrating a thin secondary battery according to Embodiment 12 of the present invention. It shows the configuration of an electrical circuit which blocks current in the external circuit when the inner pressure of the encapsulating bag rises. FIG. 24 is a sectional view illustrating the configuration of a current opening/closing switch. In FIG. 23, the reference numeral 81 indicates an external load device, the reference numeral 81a indicates a positive electrode terminal of the external load device, the reference numeral 82 indicates a current blocking device, the reference numeral 82b indicates a blocking switch for current blocking circuit, the reference numeral 82c indicates a magnetic coil, the reference numeral 83 indicates an external load circuit connecting a battery 87 to the external load device 81 for normal charging/discharging, and the reference numeral 84 indicates a current blocking circuit which passes detecting current from the battery 87 to the current blocking circuit 82. The reference numeral 85 indicates a current opening/closing switch. In FIG. 24, the reference numeral 85a indicates a contact point, the reference numeral 85b indicates an electrical insulating box, and the reference numeral 6f indicates a portion at which the expansion force of the encapsulating bag is transferred to the tip 5a of the collector tab 5.

The operation of the foregoing configuration will be described hereinafter. The current opening/closing switch 85 is composed of the negative electrode collector tab 5, the contact point 85a and the electrical insulating box 85b. During normal operation, the contact point 85a and the collector tab 5 are not electrically connected. The current opening/closing switch 85 is open so that current is not flowing in the current blocking circuit 84 and is flowing in only the external load circuit 83. When the inner pressure of the encapsulating bag rises, the portion 5a of the collector tab 5 is pushed upward. When the difference between the inner pressure and the external pressure of the encapsulating bag exceeds a first predetermined value, the contact point 85a is electrically connected to the portion 5a of the collector tab 5 to cause the current opening/closing switch 85 to be closed, enabling the passage of current in the current blocking circuit 84. At this point, both the switches 82a and 82b are open in response to a magnetic force produced by a magnetic coil 82c in the current blocking device 82 to block the passage of current in both the external load circuit 83 and the current blocking circuit 84.

The present embodiment has been described with reference to the external circuit current blocking device 82 which operates by a magnetic force. However, the use of a semiconductor device such as thyristor can provide similar results.

Embodiment 13

Figure 25:
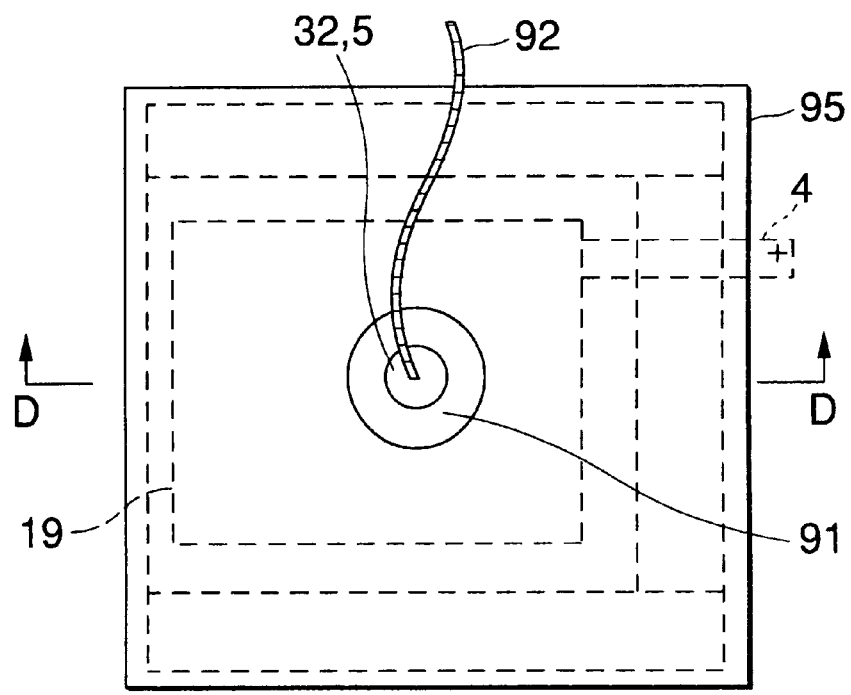
FIG. 25 is a plan view illustrating a thin secondary battery comprising a collector tab with a current blocking function according to Embodiment 13 of the present invention contained in a rectangular container.

FIG. 25 illustrates a diagram as viewed from the top of a thin secondary battery comprising a collector tab with a current blocking function according to Embodiment 13 of the present invention inserted in a rectangular container.

Figure 26:
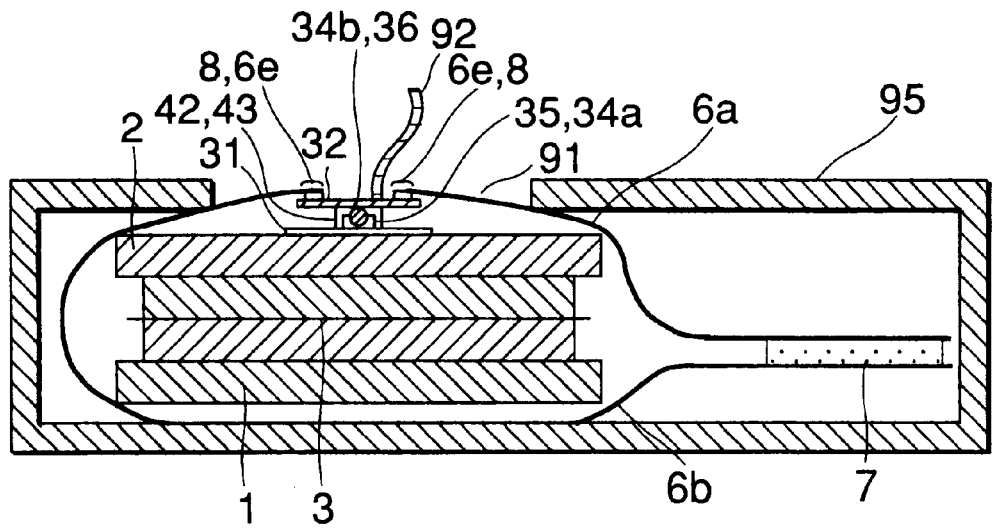
FIG. 26 is a sectional view taken on line D—D of FIG. 25.

FIG. 26 illustrates a sectional view taken on line D—D of FIG. 25. In these drawings, the reference numeral 91 indicates an opening window made in the top portion of the container 95, and the reference numeral 92 indicates a negative electrode conductor.

Embodiments 1 to 5 have been described with reference to the case where the negative electrode collector tab 5 with a current blocking function is attached to the edge side of the battery body in the vicinity of the sealing portion on the flat encapsulating bag. In the present embodiment, the negative electrode collector tab 5 with a current blocking function is attached to the top surface of the flat battery body in the vicinity of the center of the upper side of the encapsulating bag. The internal electrode connector 31 is composed of a circular metal plate with a groove 35 and is connected to the vicinity of the center of the negative electrode 2. The external circuit connector 32 is composed of a circular metal plate with a rod 36 and has a coating 8 for metal bonding. The external circuit connector 32 is bonded to the inner surface of the upper side of the encapsulating bag 6 in the vicinity of the center thereof. When the encapsulating bag 6 undergoes expansion deformation, a force is transferred to the external circuit connector 32 at the bonding portion 6e. The function of the joint 34 is quite the same as that of Embodiment 1, and its description is omitted.

It is thought that if such a thin secondary battery is inserted in a container 67 having a wall with almost the same thickness as that of the battery body, the portion 6e of the encapsulating bag cannot be completely inserted into the container, making it impossible to actuate the current blocking function. The expansion deformation required for the portion 6e of the encapsulating bag is the outer diameter of the rod 36 at largest. Thus, the provision of an opening window 91 in the center of the top of the container 95 makes it possible to cause the expansion deformation of the encapsulating bag required for the actuation of the current blocking function.

Embodiment 14

The foregoing various embodiments have been described with reference to the flat battery body comprising an electrode laminate having a positive electrode and a negative electrode laminated with an ionically-conducting layer provided interposed therebetween. However, the flat battery body may comprise a plurality of such electrode laminates. Such a laminated battery body can exhibit a battery capacity in proportion to the number of electrode laminates despite its compact form. The present embodiment will be described hereinafter in connection with the drawing.

Figure 27:
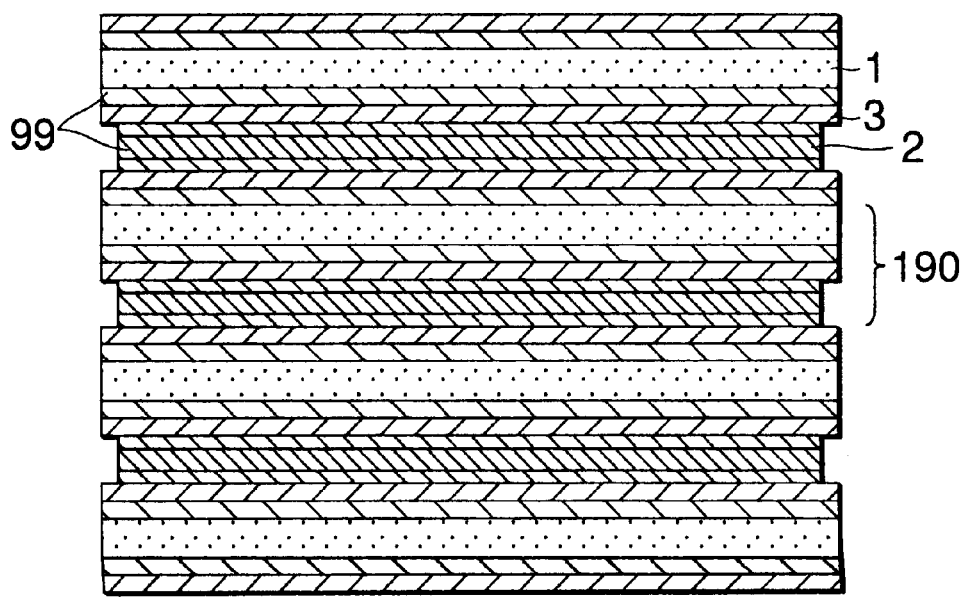
FIG. 27 is a sectional view illustrating the configuration of a battery body according to Embodiment 14 of the present invention.

In FIG. 27, there is shown provided a plurality of electrode laminates 190 having a positive electrode 1 and a negative electrode 2 laminated with an ionically-conducting layer provided interposed therebetween. The reference numeral 99 indicates an adhesive. In the present embodiment, as the separator 3 there is used, e.g., a porous polypropylene sheet (Cellguard #2400, available from Hoext Inc.) which also serves as an electrolyte layer that works as an ionically-conducting layer. The electrolyte is not specifically limited. In the case of secondary lithium battery, a solution of lithium hexafluorophosphate in a mixture of ethylene carbonate and diethyl carbonate or the like may be used. This can apply to the following Embodiments 15 to 17.

In accordance with the present embodiment, a plurality of electrode laminates are formed by alternately arranging a positive electrode and a negative electrode between a plurality of separated ionically-conducting layers.

Such a flat laminated battery body may be prepared as follows.

The adhesive 99 was applied to one side of each of two sheets of belt-like separators 3. A belt-like positive electrode 1 (or negative electrode) was then positioned interposed between the two sheets of the separators 3 in such an arrangement that the coated surface of the two sheets were opposed to each other before the adhesive 99 was dried to form a laminate. The laminate was then dried. Subsequently, a predetermined size of a sheet was stamped out from the separator laminate having the positive electrode 1 (or negative electrode) provided interposed therebetween. The adhesive 99 was then applied to one side of the separator laminate thus stamped out. The coated laminate was then laminated with the negative electrode 2 (or positive electrode) on the coated side thereof. Further, the adhesive 99 was applied to one side of another separator stamped out in a predetermined size. The separator was then laminated with the foregoing laminate of two separator laminates on the coated side thereof. This procedure was then repeated to form a battery body 19 having a plurality of electrode laminates 190. The battery body 19 was then dried under pressure to prepare a flat laminated battery body 19 as shown in FIG. 27.

Embodiment 15

Figure 28:
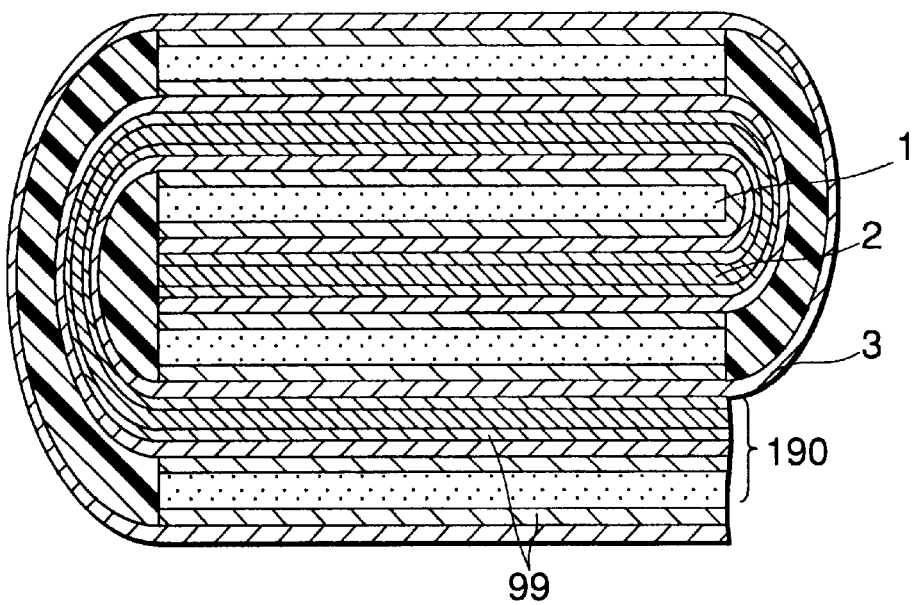
FIG. 28 is a sectional view illustrating the configuration of a battery body according to Embodiment 15 of the present invention.

FIG. 28 is a sectional view illustrating the configuration of a battery body according to Embodiment 15 of the present invention. In accordance with the present embodiment, a plurality of electrode laminates are formed by alternately arranging a positive electrode and a negative electrode between the gap of a wound ionically-conducting layer.

Such a flat wound laminated battery body may be prepared as follows.

The adhesive 99 was applied to one side of each of two sheets of belt-like separators 3. A belt-like negative electrode 2 (or positive electrode) was then positioned interposed between the two sheets of the separators 3 in such an arrangement that the coated surface of the two sheets were opposed to each other before the adhesive 99 was dried to form a laminate. The laminate was then dried. Subsequently, the adhesive 99 was applied to one side of the belt-like separator laminate having the negative electrode 2 (or positive electrode) provided interposed therebetween. One end of the separator laminate was then folded back by a predetermined amount. A positive electrode 1 (or negative electrode) was then inserted into the gap of the folded separator. The resulting laminate was then passed through a laminator. Subsequently, the adhesive 99 was applied to the other side of the belt-like separator. Another sheet of the positive electrode 1 (or negative electrode) was laminated with the belt-like separator on the coated side thereof in a position corresponding to the positive electrode 1 (or negative electrode) inserted into the gap of the folded separator. The separator was then wound in an ellipsoidal form with another sheet of the positive electrode 1 (or negative electrode) being laminated thereon. This procedure was repeated to form a battery body having a plurality of electrode laminates. The battery body was dried under pressure to prepare a flat wound laminated battery body as shown in FIG. 28.

Embodiment 16

Figure 29:
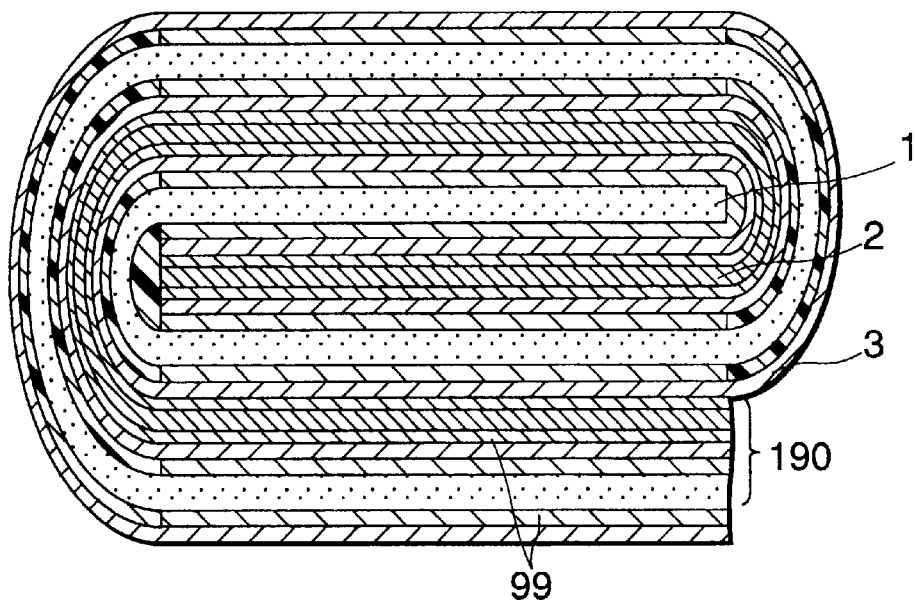
FIG. 29 is a sectional view illustrating the configuration of a battery body according to Embodiment 16 of the present invention.

FIG. 29 is a sectional view illustrating the configuration of a battery body according to Embodiment 16 of the present invention. In accordance with the present embodiment, a plurality of electrode laminates are formed by alternately arranging a positive electrode and a negative electrode between the gap of a wound ionically-conducting layer. The present embodiment differs from Embodiment 18 in that the positive electrode, the negative electrode and the separator are simultaneously wound up.

Such a flat wound laminated battery body may be prepared as follows.

A belt-like negative electrode 2 (or positive electrode) was arranged interposed between two sheets of belt-like separators. On the other hand, a belt-like positive electrode 1 (or negative electrode) was positioned on the outer side of one of the two sheets of the separators 7 in such an arrangement that it protruded from the edge of the separator by a predetermined amount.

Subsequently, the adhesive 99 was applied to the inner side of the two sheets of the separators 3 and the outer side of the one of the two sheets of the separators on which the positive electrode 1 (or negative electrode) had been placed. The positive electrode 1 (or negative electrode), the two sheets of the separators 3 and the negative electrode 2 (or positive electrode) were then laminated. The laminate thus prepared was then passed through a laminator. Subsequently, the adhesive 99 was applied to the outer side of the other of the two sheets of the separators 3. The protruding positive electrode 1 (or negative electrode) was then folded around the laminate onto the adhesive-coated surface thereof. The separator laminate was then wound in an ellipsoidal form with the folded positive electrode 1 (or negative electrode) contained there inside to form a battery body having a plurality of electrode laminates. The battery body was heated under pressure to prepare a flat wound laminated battery body.

In the foregoing embodiments, both the positive electrode 1 and the negative electrode 2 are bonded to the separator 3. However, only one of the two electrodes may be bonded to the separator 3. This configuration merely requires the winding of a separator with a negative electrode 2 (or positive electrode) comprising a belt-like negative electrode (or positive electrode) laminated interposed between two sheets of belt-like separators 3 with an adhesive 99 together with a belt-like positive electrode 1 (or negative electrode). Thus, only a simple production process is required.

Embodiment 17

Embodiments 15 and 16 have been described with reference to the case where the battery body comprises a wound separator. However, a laminate of belt-like separators with a belt-like positive electrode (or negative electrode) bonded interposed therebetween may be laminated with a negative electrode (or positive electrode) while being folded.

As mentioned above, the first aspect of the present invention concerns a thin battery comprising a flat battery body having a positive electrode and a negative electrode laminated with an ionically-conducting layer provided interposed therebetween, a flexible encapsulating bag for sealing said battery body with a sealing portion, and positive electrode collector tab and negative electrode collector tab connected to said positive electrode and said negative electrode, respectively, and penetrating a part of said encapsulating bag to make an electrical input/output to the external circuit, wherein at least one of said positive electrode collector tab and negative electrode collector tab comprises a first collector tab connected to the electrode and a second collector tab connected to the external circuit and a safety device is provided comprising a means for retaining electrical connection between said first collector tab and said second collector tab and a means which releases said retaining means when the inner pressure of said encapsulating bag excess a predetermined value. Thus, the passage of current from the battery through the external circuit can be blocked when the inner pressure of the battery rises due to overcharging or shortcircuiting in spite of the use of a relatively simple and small-sized device.

The second aspect of the present invention concerns a thin battery according to the first aspect of the present invention, wherein said releasing means releases said retaining means by making the use of expansion deformation when the difference between the inner pressure and the external pressure of said encapsulating bag exceeds a first predetermined value. Accordingly, current can be blocked depending on the pressure difference.

The third aspect of the present invention concerns a thin battery according to the first aspect of the present invention, wherein said first or second collector tab releases said retaining means in response to expansion deformation of said encapsulating bag. Accordingly, only a simple configuration can realize a releasing means.

The fourth aspect of the present invention concerns a thin battery according to the first aspect of the present invention, wherein said retaining means utilizes at least one of spring force, magnetic force, frictional force, tack and electrostatic force. Accordingly, the collector tabs can be fastened by a relatively weak force, making it easy to utilize expansion deformation of the encapsulating bag to release the retaining means. The battery having the retaining means released can be reused.

The fifth aspect of the present invention concerns a thin battery according to the first aspect of the present invention, wherein the safety device further comprises a means which releases said retaining means when the temperature rises due to the passage of excessive current. Accordingly, further, current can be blocked when excessive current flows in spite of simple configuration.

The sixth aspect of the present invention concerns a thin battery comprising a flat battery body having a positive electrode and a negative electrode laminated with an ionically-conducting layer provided interposed therebetween, an encapsulating bag for sealing said battery body with a sealing portion, and positive electrode and negative electrode collector tabs connected to said positive electrode and said negative electrode, respectively, and penetrating a part of said encapsulating bag to make an electrical input/output to the external circuit, wherein at least one of said positive electrode and negative collector tab comprises a first collector tab connected to the electrode and a second collector tab connected to the external circuit, said first and second collector tab being made of a material which deforms with the rise in the ambient temperature and a safety device is provided comprising a means for retaining electrical connection between said first collector tab and said second collector tab and a means which releases said retaining means when the temperature rises due to the passage of excessive current. Accordingly, current can be blocked when excessive current flows in spite of simple configuration.

The seventh aspect of the present invention concerns a thin battery according to the sixth aspect of the present invention, further comprising a reconnection preventive means for preventing said first and second collector tabs from making electrical reconnection to said retaining means after the release of said retaining means by said releasing means. Accordingly, once current is blocked, non-conduction can be kept unless the two collector tabs are intentionally connected to each other again.

The eighth aspect of the present invention concerns a thin battery according to the seventh aspect of the present invention, wherein said reconnection preventive means also serves as a part of said retaining means. Accordingly, the required number of parts can be reduced, rendering the device compact.

The ninth aspect of the present invention concerns a thin battery comprising a flat battery body having a positive electrode and a negative electrode laminated with an ionically-conducting layer provided interposed therebetween, a flexible encapsulating bag for sealing said battery body with a sealing portion, and positive electrode collector tab and negative electrode collector tab connected to said positive electrode and said negative electrode, respectively, and penetrating a part of said encapsulating bag to make an electrical input/output to the external circuit, wherein said sealing portion comprises a section to give an expected rupture point. Accordingly, the position at which the encapsulating bag can be ruptured when the inner pressure of the bag rises can be predetermined, making it possible to safely relax the inner pressure.

The tenth aspect of the present invention concerns a thin battery according to the eighth aspect of the present invention, wherein said section having a weak peel strength. Accordingly, the rupture position can be predetermined more securely.

The eleventh aspect of the present invention concerns a thin battery according to the tenth aspect of the present invention, wherein said section is provided on a portion which undergoes a great peel stress due to expansion deformation of said encapsulating bag. Accordingly, the rupture position can be predetermined more securely.

The twelfth aspect of the present invention is a thin battery according to the tenth aspect of the present invention, a hole is made in said sealing portion on a portion which undergoes a great peel stress due to expansion deformation of said encapsulating bag to give an expected rupture point. Accordingly, the position at which the encapsulating bag can be ruptured when the inner pressure of the bag rises can be predetermined, making it possible to safely relax the inner pressure.

The thirteenth aspect of the present invention concerns a thin battery comprising a flat battery body having a positive electrode and a negative electrode laminated with an ionically-conducting layer provided interposed therebetween, a flexible encapsulating bag for sealing said battery body with a sealing portion, and positive electrode collector tab and negative electrode collector tab connected to said positive electrode and said negative electrode, respectively, and penetrating a part of said encapsulating bag to make an electrical input/output to the external circuit, characterized in that a sharp protrusion is provided which penetrates said encapsulating bag at the expected rupture point when said encapsulating bag undergoes expansion deformation. Accordingly, the position at which the encapsulating bag can be ruptured when the inner pressure of the bag rises can be predetermined, making it possible to safely relax the inner pressure.

The fourteenth aspect of the present invention concerns a thin battery according to the thirteenth to twelfth aspects of the present invention, wherein said expected rupture point is covered by a liquid-absorbing material. Accordingly, electrolyte leakage can be prevented.

The fifteenth aspect of the present invention concerns a thin battery according to thirteenth aspect of the present invention, wherein said expected rupture point is covered by an exhaust mechanism having an exhaust path and an exhaust outlet. Accordingly, exhaust gas can be introduced to the desired place.

The sixteenth aspect of the present invention concerns a thin battery according to the first aspect of the present invention, wherein said safety device is provided on the top surface of said flat battery body or on the side surface of said battery body in the vicinity of said sealing portion. Accordingly, even when the thin battery is operated in a thin container, a safety mechanism composed of the foregoing safety device or connecting means can normally operate.

The seventeenth to twentieth aspects of the present invention concern a thin battery according to the first to sixteenth aspects of the present invention, wherein said flat battery body comprises a plurality of electrode laminates having a positive electrode and a negative electrode laminated with an ionically-conducting layer provided interposed therebetween. The plurality of electrode laminates are formed by alternately arranging a positive electrode and a negative electrode between a plurality of separated ionically-conducting layers or between the gap of a wound or folded separator. Accordingly, a battery capacity proportional to the number of the plurality of electrode laminates can be provided in spite of compact form.

What is claimed is:

1. A thin battery comprising a flat battery body having a positive electrode and a negative electrode laminated with an ionically-conducting layer provided interposed therebetween, a flexible encapsulating bag for sealing said battery body with a sealing portion, and a positive electrode collector tab and a negative electrode collector tab connected to said positive electrode and said negative electrode, respectively, and penetrating a part of said encapsulating bag to make an electrical input/output, wherein at least one of said positive electrode collector tab and negative electrode collector tab comprises a first collector tab connected to the electrode and a second collector tab and a safety device is provided comprising a means for retaining electrical connection between said first collector tab and said second collector tab and a means which releases said retaining means using expansion deformation of said encapsulating bag when the inner pressure of said encapsulating bag exceeds a predetermined value.

2. The thin battery as claimed in claim 1, wherein said releasing means releases said retaining means by making the use of expansion deformation of said bag due to the rise when the difference between the inner pressure and the external pressure of said encapsulating bag exceeds a first predetermined value.

3. The thin battery as claimed in claim 1, wherein said first or second collector tab releases said retaining means in response to expansion deformation of said encapsulating bag.

4. The thin battery as claimed in claim 1, wherein said retaining means utilizes at least one of spring force, magnetic force, frictional force, tack and electrostatic force.

5. The thin battery as claimed in claim 1, wherein said safety device further comprises a means which releases said retaining means when the temperature rises due to the passage of excessive current.

6. The thin battery as claimed in claim 1, comprising said retaining means and said means which releases being disposed outside of said bag.

7. The thin battery as claimed in claim 1, wherein said safety device is provided on the top surface of said flat battery body or on the side surface of said battery body in the vicinity of said sealing portion.

8. The thin battery as claimed in claims 1, wherein said flat battery body comprises a plurality of electrode laminates having a positive electrode and a negative electrode laminated with an ionically-conducting layer provided interposed therebetween.

9. The thin battery as claimed in claim 8, wherein said plurality of electrode laminates are formed by alternately arranging a positive electrode and a negative electrode between a plurality of separated ionically-conducting layers.

10. The thin battery as claimed in claim 8, wherein said plurality of electrode laminates are formed by alternately interposing a positive electrode and a negative electrode between the gap of a wound ionically-conducting layer.

11. The thin battery as claimed in claim 8, wherein said plurality of electrode laminates are formed by alternately interposing a positive electrode and a negative electrode between the gap of a folded ionically-conducting layer.

12. A thin battery comprising a flat battery body having a positive electrode and a negative electrode laminated with an ionically-conducting layer provided interposed therebetween, a flexible encapsulating bag for sealing said battery body with a sealing portion, and a positive electrode collector tab and a negative electrode collector tab connected to said positive electrode and said negative electrode, respectively, and penetrating a part of said encapsulating bag to make an electrical input/output, wherein at least one of said positive electrode and negative electrode collector tab comprises a first collector tab connected to the electrode and a second collector tab, said first and second collector tab being made of a material which deforms with the rise in the ambient temperature and a safety device is provided comprising a means for retaining electrical connection between said first collector tab and said second collector tab and a means which releases said retaining means when the inner pressure of said encapsulating bag exceeds a predetermined value using expansion deformation of said encapsulating bag and when the temperature rises due to the passage of excessive current.

13. The thin battery as claimed in claim 12, further comprising a reconnection preventive means for preventing, said first and second collector tabs from making electrical reconnection to said retaining means after the release of said retaining means by said releasing means.

14. The thin battery as claimed in claim 13, wherein said reconnection preventive means also serves as a part of said retaining means.

15. A thin battery comprising a flat battery body having a positive electrode and a negative electrode laminated with an ionically-conducting layer provided interposed therebetween, a flexible encapsulating bag for sealing said battery body with a sealing portion, and a positive electrode collector tab and a negative electrode collector tab connected to said positive electrode and said negative electrode, respectively, and penetrating a part of said encapsulating bag to make an electrical input/output, wherein said sealing portion comprises a section to give an expected rupture point from expansion deformation of said encapsulating bag.

16. The thin battery as claimed in claim 15, wherein said section has a reduced weak peel strength.

17. The thin battery as claimed in claim 16, wherein said section is provided on a portion which undergoes a peel stress due to expansion deformation of said encapsulating bag.

18. The thin battery as claimed in claim 16, wherein said expected rupture point has a hole made in said sealing portion on a portion which undergoes a great peel stress due to expansion deformation of said encapsulating bag.

19. The thin battery as claimed in claim 15, wherein a sharp protrusion is provided which penetrates said encapsulating bag at the expected rupture point when said encapsulating bag undergoes expansion deformation.

20. The thin battery as claimed in claim 19, wherein said expected rupture point is covered by a liquid-absorbing material.

21. The thin battery as claimed in claim 19, wherein said expected rupture point is covered by an exhaust mechanism having an exhaust path and an exhaust outlet.

\* \* \* \* \*